United States Patent
Kim et al.

(10) Patent No.: US 10,869,300 B2
(45) Date of Patent: Dec. 15, 2020

(54) UPLINK SIGNAL TRANSMISSION METHOD OF TERMINAL IN WIRELESS COMMUNICATION SYSTEM AND DEVICE FOR SUPPORTING SAME

(71) Applicant: LG ELECTRONICS INC., Seoul (KR)

(72) Inventors: Seonwook Kim, Seoul (KR); Jaehyung Kim, Seoul (KR); Hanjun Park, Seoul (KR); Suckchel Yang, Seoul (KR); Yunjung Yi, Seoul (KR); Changhwan Park, Seoul (KR); Hyukjin Chae, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/476,525

(22) PCT Filed: Jan. 8, 2018

(86) PCT No.: PCT/KR2018/000330
§ 371 (c)(1),
(2) Date: Jul. 8, 2019

(87) PCT Pub. No.: WO2018/128492
PCT Pub. Date: Jul. 12, 2018

(65) Prior Publication Data
US 2019/0380124 A1 Dec. 12, 2019

Related U.S. Application Data

(60) Provisional application No. 62/443,799, filed on Jan. 8, 2017, provisional application No. 62/454,070, filed
(Continued)

(51) Int. Cl.
*H04W 72/04* (2009.01)

(52) U.S. Cl.
CPC ... *H04W 72/0413* (2013.01); *H04W 72/0446* (2013.01)

(58) Field of Classification Search
CPC .................................................. H04W 72/0413
See application file for complete search history.

(56) References Cited

U.S. PATENT DOCUMENTS

| 9,510,132 B2 * | 11/2016 | Xu ........................ H04B 7/0413 |
| 2010/0103902 A1 * | 4/2010 | Kim ...................... H04L 5/0048 |
| | | 370/330 |

(Continued)

OTHER PUBLICATIONS

PCT International Application No. PCT/KR2018/000330, Written Opinion of the International Searching Authority dated Apr. 6, 2018, 22 pages.

(Continued)

*Primary Examiner* — Parth Patel
(74) *Attorney, Agent, or Firm* — Lee Hong Degerman Kang Waimey

(57) ABSTRACT

Disclosed is an uplink signal transmission method of a terminal, comprising: determining a multiplexing method of a plurality of uplink signals scheduled during a time interval of a predetermined length by considering the maximum transmission power of the terminal; and transmitting the plurality of uplink signals during the time interval of the predetermined length on the basis of the determined multiplexing method. Herein, the multiplexing method may include a first multiplexing method for performing puncturing or rate matching of a resource element level during the first symbol interval for the first uplink signal and/or the second uplink signal, or a second multiplexing method for adding information included in the first uplink signal and the second uplink signal and transmitting the added information through the first uplink signal or the second uplink signal.

10 Claims, 13 Drawing Sheets

Related U.S. Application Data on Feb. 3, 2017, provisional application No. 62/501,071, filed on May 3, 2017.

(56) References Cited

U.S. PATENT DOCUMENTS

| | | | | |
|---|---|---|---|---|
| 2011/0274099 | A1* | 11/2011 | Kwon | H04L 5/003 370/338 |
| 2012/0243497 | A1* | 9/2012 | Chung | H04L 1/1861 370/329 |
| 2013/0114505 | A1* | 5/2013 | Haim | H04W 52/243 370/328 |
| 2013/0272189 | A1* | 10/2013 | Lee | H04L 5/0007 370/315 |
| 2014/0105141 | A1* | 4/2014 | Noh | H04L 5/0058 370/329 |
| 2014/0112168 | A1* | 4/2014 | Chen | H04B 7/046 370/252 |
| 2014/0119302 | A1* | 5/2014 | Ahn | H04W 72/0446 370/329 |
| 2014/0204922 | A1* | 7/2014 | Kim | H04J 3/12 370/336 |
| 2015/0036566 | A1* | 2/2015 | Blankenship | H04W 72/0413 370/311 |
| 2015/0139141 | A1* | 5/2015 | Seo | H04L 5/0048 370/329 |
| 2015/0304957 | A1* | 10/2015 | Noh | H04W 52/367 455/522 |
| 2016/0095069 | A1* | 3/2016 | Noh | H04L 1/1671 455/452.1 |
| 2016/0135172 | A1* | 5/2016 | Sun | H04W 74/006 370/329 |
| 2016/0278117 | A1* | 9/2016 | Sahlin | H04B 7/2615 |
| 2016/0337157 | A1* | 11/2016 | Papasakellariou | H04B 3/232 |
| 2017/0118768 | A1* | 4/2017 | Seo | H04B 1/38 |
| 2017/0181136 | A1* | 6/2017 | Bharadwaj | H04W 84/12 |
| 2018/0063820 | A1* | 3/2018 | Xiong | H04W 72/042 |
| 2018/0076942 | A1* | 3/2018 | Nory | H04L 5/0055 |
| 2018/0077658 | A1* | 3/2018 | Nory | H04L 5/0048 |
| 2018/0077719 | A1* | 3/2018 | Nory | H04W 72/1278 |
| 2018/0132229 | A1* | 5/2018 | Li | H04W 72/0413 |
| 2018/0132264 | A1* | 5/2018 | Jung | H04L 1/1812 |
| 2018/0167933 | A1* | 6/2018 | Yin | H04W 72/1284 |
| 2018/0192442 | A1* | 7/2018 | Li | H04W 16/14 |
| 2018/0338306 | A1* | 11/2018 | Wu | H04L 5/0053 |
| 2019/0132837 | A1* | 5/2019 | Yi | H04L 5/0032 |
| 2019/0174516 | A1* | 6/2019 | Shimezawa | H04W 72/1263 |
| 2019/0239123 | A1* | 8/2019 | Kim | H04W 72/0453 |
| 2019/0380124 | A1* | 12/2019 | Kim | H04L 5/0048 |
| 2020/0036501 | A1* | 1/2020 | Gao | H04W 72/0493 |
| 2020/0077386 | A1* | 3/2020 | Papasakellariou | H04L 5/0055 |
| 2020/0187169 | A1* | 6/2020 | Gao | H04L 5/0094 |

OTHER PUBLICATIONS

CATT, "Discussion on multiplexing of normal TTI and sTTI", 3GPP TSG RAN WG1 Meeting #87, R1-1611350, Nov. 2016, 6 pages.
Huawei, et al., "Handling collision between PUCCH and sPUCCH", 3GPP TSG RAN WG1 Meeting #87, R1-1611164, Nov. 2016, 4 pages.
Motorola, "Multiplexing of regular TTI and shortend TTI", 3GPP TSG RAN WG1 Meeting #87, R1-1612740, Nov. 2016, 6 pages.
Mediatek, "Multiplexing of PUCCH and other channels", 3GPP TSG RAN WG1 Meeting #87, R1-1612140, Nov. 2016, 5 pages.

* cited by examiner

UPLINK SIGNAL TRANSMISSION METHOD OF TERMINAL IN WIRELESS COMMUNICATION SYSTEM AND DEVICE FOR SUPPORTING SAME

CROSS-REFERENCE TO RELATED APPLICATIONS

This application is the National Stage filing under 35 U.S.C. 371 of International Application No. PCT/KR2018/000330, filed on Jan. 8, 2018, which claims the benefit of U.S. Provisional Application No. 62/443,799, filed on Jan. 8, 2017, 62/454,070, filed on Feb. 3, 2017, and 62/501,071, filed on May 3, 2017, the contents of which are all hereby incorporated by reference herein in their entirety.

TECHNICAL FIELD

The present disclosure relates to a wireless communication system, and more particularly to, a method by which a terminal transmits an uplink signal to a base station in a wireless communication system where various numerology is applicable and device for supporting the same.

More specifically, the present disclosure provides a method by which a terminal multiplexes a plurality of uplink signals and transmit the multiplexed uplink signals to a base station when the terminal is scheduled with the plurality of uplink signals.

BACKGROUND ART

Wireless access systems have been widely deployed to provide various types of communication services such as voice or data. In general, a wireless access system is a multiple access system that supports communication of multiple users by sharing available system resources (a bandwidth, transmission power, etc.) among them. For example, multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, and a Single Carrier Frequency Division Multiple Access (SC-FDMA) system.

As a number of communication devices have required higher communication capacity, the necessity of the mobile broadband communication much improved than the existing radio access technology (RAT) has increased. In addition, massive machine type communications (MTC) capable of providing various services at anytime and anywhere by connecting a number of devices or things to each other has been considered in the next generation communication system. Moreover, a communication system design capable of supporting services/UEs sensitive to reliability and latency has been discussed.

As described above, the introduction of the next generation RAT considering the enhanced mobile broadband communication, massive MTC, Ultra-reliable and low latency communication (URLLC), and the like has been discussed.

DISCLOSURE OF THE INVENTION

Technical Task

The object of the present disclosure is to provide a method by which a user equipment (UE) transmits an uplink signal in a newly proposed communication system.

In particular, the object of the present disclosure is to provide a configuration in which a UE multiplexes a plurality of uplink signals and transmits the multiplexed uplink signals when the UE is scheduled with the plurality of uplink signals from a base station in a newly proposed communication system.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solution

The present disclosure proposes a method by which a UE transmits an uplink signal in a wireless communication system and device therefor.

In an aspect of the present disclosure, provided is a method of transmitting an uplink signal to a base station by a User Equipment (UE) in a wireless communication system. The method may include: determining a method of multiplexing a plurality of uplink signals scheduled during a predetermined length of time period by considering maximum transmission power of the UE; and transmitting the plurality of uplink signals during the predetermined length of time period based on the determined multiplexing method. When a first uplink signal and a second uplink signal, among the plurality of uplink signals, overlap with each other within a first symbol period in a time resource domain, the multiplexing method may include a first multiplexing method of performing puncturing or rate-matching at a Resource Element (RE) level during the first symbol period for either or both of the first uplink signal and second uplink signal or a second multiplexing method of combining information included in the first uplink signal and second uplink signal and transmitting the information via the first uplink signal or second uplink signal.

In another aspect of the present disclosure, provided is a User Equipment (UE) for transmitting an uplink signal to a base station in a wireless communication system. The UE may include: a transmitter; a receiver; and a processor connected to the transmitter and the receiver. In this case, the processor may be configured to: determine a method of multiplexing a plurality of uplink signals scheduled during a predetermined length of time period by considering maximum transmission power of the UE; and transmit the plurality of uplink signals during the predetermined length of time period based on the determined multiplexing method. When a first uplink signal and a second uplink signal, among the plurality of uplink signals, overlap with each other within a first symbol period in a time resource domain, the multiplexing method comprises a first multiplexing method of performing puncturing or rate-matching at a Resource Element (RE) level during the first symbol period for either or both of the first uplink signal and second uplink signal or a second multiplexing method of combining information included in the first uplink signal and second uplink signal and transmitting the information via the first uplink signal or second uplink signal.

The predetermined length of time period may correspond to one slot including 14 symbol periods.

In addition, the first uplink signal or second uplink signal may correspond to any one of the following: a Physical Uplink Control Channel (PUCCH) composed of one or two symbols, a PUCCH composed of three or more symbols, a Physical Uplink Shared Channel (PUSCH) composed of three or fewer symbols, a PUSCH composed of four or more symbols, and a Sounding Reference Signal (SRS) composed of at least one symbol.

For example, when each of the first uplink signal and second uplink signal corresponds to the PUCCH composed of one or two symbols and when the first uplink signal and second uplink signal overlap within the first symbol period in the time resource domain, the first multiplexing method may be applied as a multiplexing method for the first uplink signal and second uplink signal. The first multiplexing method may include a method of performing the puncturing at the RE level during the first symbol period for both of the first uplink signal and the second uplink signal or a method of performing the puncturing at the RE level during the first symbol period for an uplink signal not including acknowledgement information among the first uplink signal and second uplink signal.

As another example, the first multiplexing method may include a method of performing the puncturing or rate-matching on all REs within the first symbol period for the either or both of the first uplink signal and second uplink signal.

As still another example, the first multiplexing method may include a method of performing the puncturing or rate-matching on a predetermined number of REs within the first symbol period for the either or both of the first uplink signal and second uplink signal, and the predetermined number of REs may be set to a minimum number of REs satisfying the maximum transmission power of the UE.

In this case, the predetermined number of REs may be determined in descending order of indices from an RE with a largest RE index among all REs for the either or both of the first uplink signal and second uplink signal within the first symbol period.

Alternatively, the predetermined number of REs are composed of only REs that are not included in frequency bands where no Demodulation Reference Signal (DM-RS) is transmitted among all REs for the either or both of the first uplink signal and second uplink signal within the first symbol period.

As a further example, when each of the first uplink signal and second uplink signal corresponds to a Physical Uplink Control Channel (PUCCH) and when the first uplink signal and second uplink signal overlap within the first symbol period in the time resource domain, the second multiplexing method may be applied as a multiplexing method for the first uplink signal and second uplink signal.

In this case, when the first uplink signal is scheduled such that the first uplink signal precedes the second uplink signal in a time domain, the second multiplexing method may include a method of combining the information included in the first uplink signal and second uplink signal and transmitting the information via the second uplink signal.

In addition, a same precoding method may be applied to the first uplink signal and second uplink signal.

Additionally, when the plurality of uplink signals are transmitted during the predetermined length of time period based on the first multiplexing method, the UE may transmit, to the base station, information on the number of REs on which the puncturing is performed.

It is to be understood that both the foregoing general description and the following detailed description of the present disclosure are exemplary and explanatory and are intended to provide further explanation of the disclosure as claimed.

Advantageous Effects

As is apparent from the above description, the embodiments of the present invention have the following effects.

According to the present disclosure, a UE can transmit, to a base station, a plurality of uplink signals, which are scheduled by the base station, using power equal to or less than maximum transmission power of the UE.

It will be appreciated by persons skilled in the art that the effects that can be achieved with the present disclosure are not limited to what has been particularly described hereinabove and other advantages of the present disclosure will be more clearly understood from the following detailed description taken in conjunction with the accompanying drawings.

DESCRIPTION OF DRAWINGS

The accompanying drawings, which are included to provide a further understanding of the invention, provide embodiments of the present invention together with detail explanation. Yet, a technical characteristic of the present invention is not limited to a specific drawing. Characteristics disclosed in each of the drawings are combined with each other to configure a new embodiment. Reference numerals in each drawing correspond to structural elements.

BEST MODE FOR INVENTION

Figure 1:
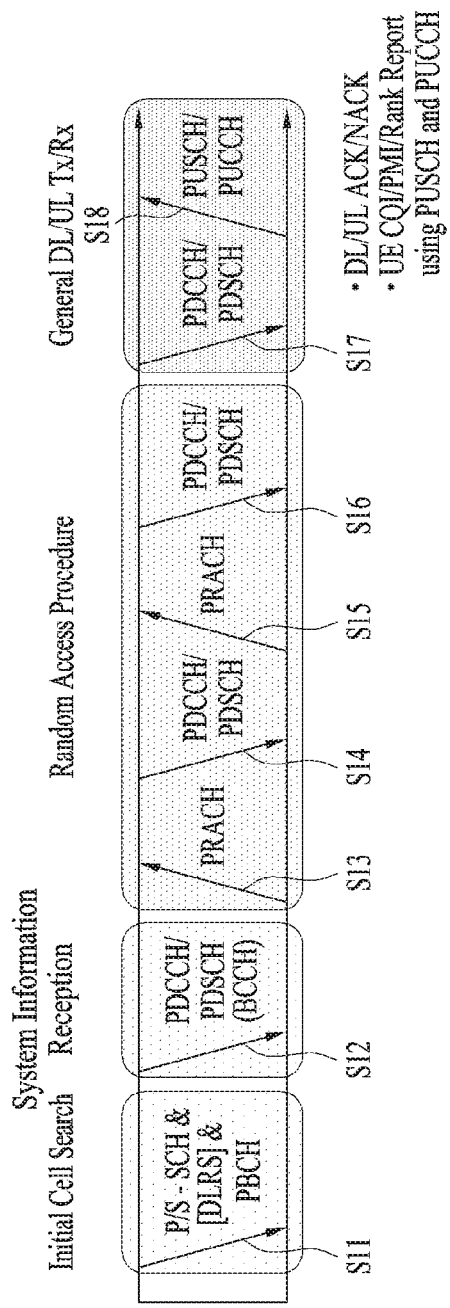
FIG. 1 is a diagram illustrating physical channels and a signal transmission method using the physical channels.

The embodiments of the present disclosure described below are combinations of elements and features of the present disclosure in specific forms. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions or elements of any one embodiment may be included in another embodiment and may be replaced with corresponding constructions or features of another embodiment.

In the description of the attached drawings, a detailed description of known procedures or steps of the present disclosure will be avoided lest it should obscure the subject matter of the present disclosure. In addition, procedures or steps that could be understood to those skilled in the art will not be described either.

Throughout the specification, when a certain portion "includes" or "comprises" a certain component, this indicates that other components are not excluded and may be further included unless otherwise noted. The terms "unit", "-or/er" and "module" described in the specification indicate a unit for processing at least one function or operation, which may be implemented by hardware, software or a combination thereof. In addition, the terms "a or an", "one", "the" etc. may include a singular representation and a plural representation in the context of the present disclosure (more particularly, in the context of the following claims) unless indicated otherwise in the specification or unless context clearly indicates otherwise.

In the embodiments of the present disclosure, a description is mainly made of a data transmission and reception relationship between a Base Station (BS) and a User Equipment (UE). A BS refers to a terminal node of a network, which directly communicates with a UE. A specific operation described as being performed by the BS may be performed by an upper node of the BS.

Namely, it is apparent that, in a network comprised of a plurality of network nodes including a BS, various operations performed for communication with a UE may be performed by the BS, or network nodes other than the BS. The term 'BS' may be replaced with a fixed station, a Node B, an evolved Node B (eNode B or eNB), an Advanced Base Station (ABS), an access point, etc.

In the embodiments of the present disclosure, the term terminal may be replaced with a UE, a Mobile Station (MS), a Subscriber Station (SS), a Mobile Subscriber Station (MSS), a mobile terminal, an Advanced Mobile Station (AMS), etc.

A transmission end is a fixed and/or mobile node that provides a data service or a voice service and a reception end is a fixed and/or mobile node that receives a data service or a voice service. Therefore, a UE may serve as a transmission end and a BS may serve as a reception end, on an UpLink (UL). Likewise, the UE may serve as a reception end and the BS may serve as a transmission end, on a DownLink (DL).

The embodiments of the present disclosure may be supported by standard specifications disclosed for at least one of wireless access systems including an Institute of Electrical and Electronics Engineers (IEEE) 802.xx system, a 3rd Generation Partnership Project (3GPP) system, a 3GPP Long Term Evolution (LTE) system, and a 3GPP2 system. In particular, the embodiments of the present disclosure may be supported by the standard specifications, 3GPP TS 36.211, 3GPP TS 36.212, 3GPP TS 36.213, 3GPP TS 36.321 and 3GPP TS 36.331. That is, the steps or parts, which are not described to clearly reveal the technical idea of the present disclosure, in the embodiments of the present disclosure may be explained by the above standard specifications. All terms used in the embodiments of the present disclosure may be explained by the standard specifications.

Reference will now be made in detail to the embodiments of the present disclosure with reference to the accompanying drawings. The detailed description, which will be given below with reference to the accompanying drawings, is intended to explain exemplary embodiments of the present disclosure, rather than to show the only embodiments that can be implemented according to the disclosure.

The following detailed description includes specific terms in order to provide a thorough understanding of the present disclosure. However, it will be apparent to those skilled in the art that the specific terms may be replaced with other terms without departing the technical spirit and scope of the present disclosure.

For example, the term, TxOP may be used interchangeably with transmission period or Reserved Resource Period (RRP) in the same sense. Further, a Listen-Before-Talk (LBT) procedure may be performed for the same purpose as a carrier sensing procedure for determining whether a channel state is idle or busy, CCA (Clear Channel Assessment), CAP (Channel Access Procedure).

Hereinafter, 3GPP LTE/LTE-A systems are explained, which are examples of wireless access systems.

The embodiments of the present disclosure can be applied to various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), etc.

CDMA may be implemented as a radio technology such as Universal Terrestrial Radio Access (UTRA) or CDMA2000. TDMA may be implemented as a radio technology such as Global System for Mobile communications (GSM)/General packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved UTRA (E-UTRA), etc.

UTRA is a part of Universal Mobile Telecommunications System (UMTS). 3GPP LTE is a part of Evolved UMTS (E-UMTS) using E-UTRA, adopting OFDMA for DL and SC-FDMA for UL. LTE-Advanced (LTE-A) is an evolution of 3GPP LTE. While the embodiments of the present disclosure are described in the context of a 3GPP LTE/LTE-A system in order to clarify the technical features of the present disclosure, the present disclosure is also applicable to an IEEE 802.16e/m system, etc.

1. 3GPP LTE/LTE-A System 1.1. Physical Channels and Signal Transmission and Reception Method Using the Same In a wireless access system, a UE receives information from an eNB on a DL and transmits information to the eNB on a UL. The information transmitted and received between the UE and the eNB includes general data information and various types of control information. There are many physical channels according to the types/usages of information transmitted and received between the eNB and the UE.

FIG. 1 illustrates physical channels and a general signal transmission method using the physical channels, which may be used in embodiments of the present disclosure.

When a UE is powered on or enters a new cell, the UE performs initial cell search (S11). The initial cell search involves acquisition of synchronization to an eNB. Specifically, the UE synchronizes its timing to the eNB and acquires information such as a cell Identifier (ID) by receiving a Primary Synchronization Channel (P-SCH) and a Secondary Synchronization Channel (S-SCH) from the eNB.

Then the UE may acquire information broadcast in the cell by receiving a Physical Broadcast Channel (PBCH) from the eNB.

During the initial cell search, the UE may monitor a DL channel state by receiving a Downlink Reference Signal (DL RS).

After the initial cell search, the UE may acquire more detailed system information by receiving a Physical Downlink Control Channel (PDCCH) and receiving a Physical Downlink Shared Channel (PDSCH) based on information of the PDCCH (S12).

To complete connection to the eNB, the UE may perform a random access procedure with the eNB (S13 to S16). In the random access procedure, the UE may transmit a preamble on a Physical Random Access Channel (PRACH) (S13) and may receive a PDCCH and a PDSCH associated with the PDCCH (S14). In the case of contention-based random access, the UE may additionally perform a contention resolution procedure including transmission of an additional PRACH (S15) and reception of a PDCCH signal and a PDSCH signal corresponding to the PDCCH signal (S16).

After the above procedure, the UE may receive a PDCCH and/or a PDSCH from the eNB (S17) and transmit a Physical Uplink Shared Channel (PUSCH) and/or a Physical Uplink Control Channel (PUCCH) to the eNB (S18), in a general UL/DL signal transmission procedure.

Control information that the UE transmits to the eNB is generically called Uplink Control Information (UCI). The UCI includes a Hybrid Automatic Repeat and reQuest Acknowledgement/Negative Acknowledgement (HARQ-ACK/NACK), a Scheduling Request (SR), a Channel Quality Indicator (CQI), a Precoding Matrix Index (PMI), a Rank Indicator (RI), etc.

In the LTE system, UCI is generally transmitted on a PUCCH periodically. However, if control information and traffic data should be transmitted simultaneously, the control information and traffic data may be transmitted on a PUSCH. In addition, the UCI may be transmitted aperiodically on the PUSCH, upon receipt of a request/command from a network.

1.2. Resource Structure

Figure 2:
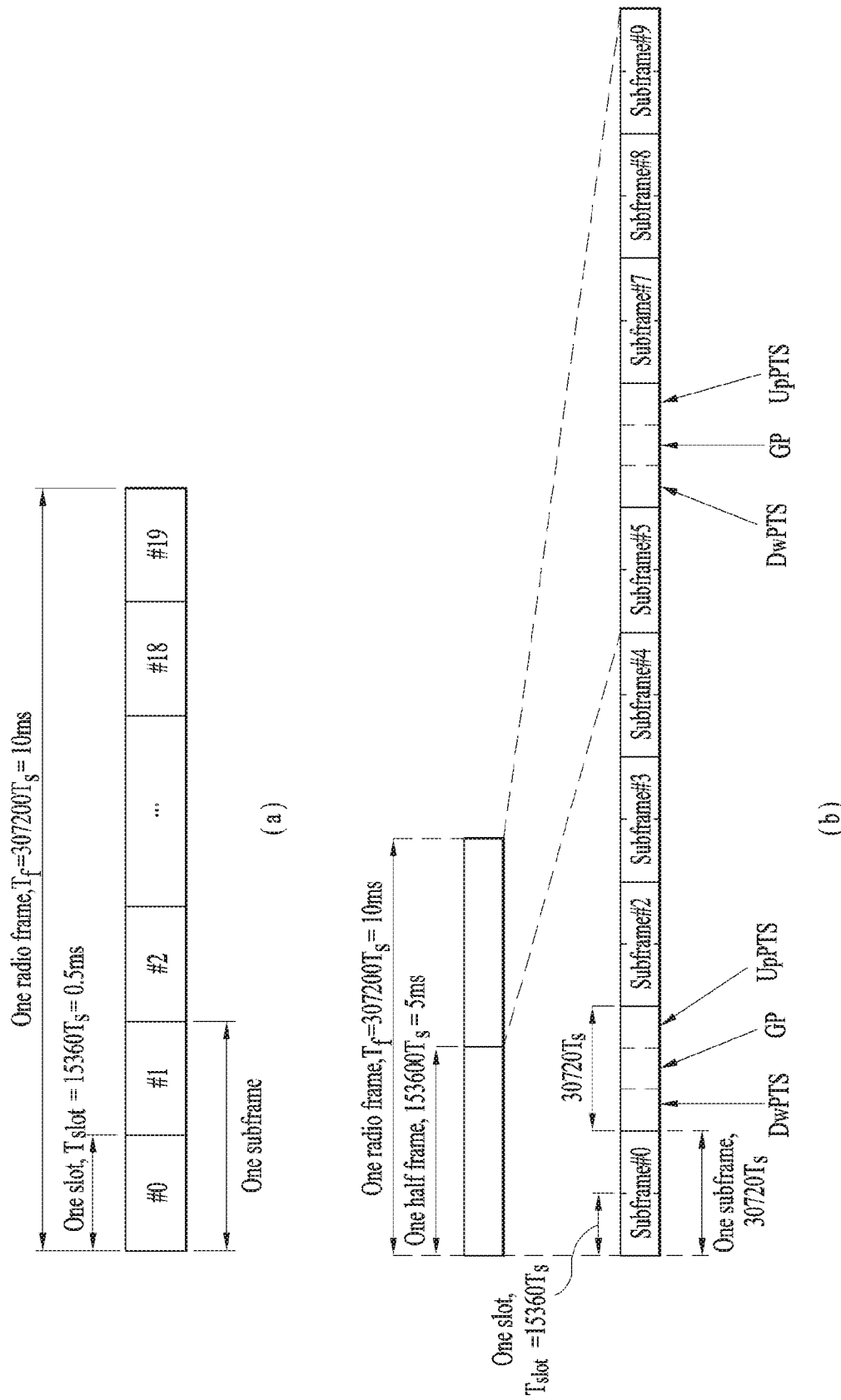
FIG. 2 is a diagram illustrating exemplary radio frame structures.

FIG. 2 illustrates exemplary radio frame structures used in embodiments of the present disclosure.

FIG. 2(a) illustrates frame structure type 1. Frame structure type 1 is applicable to both a full Frequency Division Duplex (FDD) system and a half FDD system.

One radio frame is 10 ms (Tf=307200·Ts) long, including equal-sized 20 slots indexed from 0 to 19. Each slot is 0.5 ms (Tslot=15360·Ts) long. One subframe includes two successive slots. An ith subframe includes 2ith and (2i+1)th slots. That is, a radio frame includes 10 subframes. A time required for transmitting one subframe is defined as a Transmission Time Interval (TTI). Ts is a sampling time given as Ts=1/(15 kHz×2048)=3.2552×10−8 (about 33 ns). One slot includes a plurality of Orthogonal Frequency Division Multiplexing (OFDM) symbols or SC-FDMA symbols in the time domain by a plurality of Resource Blocks (RBs) in the frequency domain.

A slot includes a plurality of OFDM symbols in the time domain Since OFDMA is adopted for DL in the 3GPP LTE system, one OFDM symbol represents one symbol period. An OFDM symbol may be called an SC-FDMA symbol or symbol period. An RB is a resource allocation unit including a plurality of contiguous subcarriers in one slot.

In a full FDD system, each of 10 subframes may be used simultaneously for DL transmission and UL transmission during a 10-ms duration. The DL transmission and the UL transmission are distinguished by frequency. On the other hand, a UE cannot perform transmission and reception simultaneously in a half FDD system.

The above radio frame structure is purely exemplary. Thus, the number of subframes in a radio frame, the number of slots in a subframe, and the number of OFDM symbols in a slot may be changed.

FIG. 2(b) illustrates frame structure type 2. Frame structure type 2 is applied to a Time Division Duplex (TDD) system. One radio frame is 10 ms (Tf=307200·Ts) long, including two half-frames each having a length of 5 ms (=153600·Ts) long. Each half-frame includes five subframes each being 1 ms (=30720·Ts) long. An ith subframe includes 2ith and (2i+1)th slots each having a length of 0.5 ms (Tslot=15360·Ts). Ts is a sampling time given as Ts=1/(15 kHz×2048)=3.2552×10−8 (about 33 ns).

A type-2 frame includes a special subframe having three fields, Downlink Pilot Time Slot (DwPTS), Guard Period (GP), and Uplink Pilot Time Slot (UpPTS). The DwPTS is used for initial cell search, synchronization, or channel estimation at a UE, and the UpPTS is used for channel estimation and UL transmission synchronization with a UE at an eNB. The GP is used to cancel UL interference between a UL and a DL, caused by the multi-path delay of a DL signal.

Table 1 below lists special subframe configurations (DwPTS/GP/UpPTS lengths).

TABLE 1

| | | Normal cyclic prefix in downlink | | Extended cyclic prefix in downlink | | |
|---|---|---|---|---|---|---|
| | | UpPTS | | | UpPTS | |
| | | Normal | Extended | | | |
| Special subframe configuration | DwPTS | cyclic prefix in uplink | cyclic prefix in uplink | DwPTS | Normal cyclic prefix in uplink | Extended cyclic prefix in uplink |
| 0 | 6592 · $T_s$ | 2192 · $T_s$ | 2560 · $T_s$ | 7680 · $T_s$ | 2192 · $T_s$ | 2560 · $T_s$ |
| 1 | 19760 · $T_s$ | | | 20480 · $T_s$ | | |
| 2 | 21952 · $T_s$ | | | 23040 · $T_s$ | | |
| 3 | 24144 · $T_s$ | | | 25600 · $T_s$ | | |
| 4 | 26336 · $T_s$ | | | 7680 · $T_s$ | 4384 · $T_s$ | 5120 · $T_s$ |
| 5 | 6592 · $T_s$ | 4384 · $T_s$ | 5120 · $T_s$ | 20480 · $T_s$ | | |

TABLE 1-continued

| | | Normal cyclic prefix in downlink | | | Extended cyclic prefix in downlink | |
| --- | --- | --- | --- | --- | --- | --- |
| | | UpPTS | | | UpPTS | |
| | | Normal | Extended | | Normal cyclic | Extended cyclic |
| Special subframe configuration | DwPTS | cyclic prefix in uplink | cyclic prefix in uplink | DwPTS | prefix in uplink | prefix in uplink |
| 6 | $19760 \cdot T_s$ | | | $23040 \cdot T_s$ | | |
| 7 | $21952 \cdot T_s$ | | | $12800 \cdot T_s$ | | |
| 8 | $24144 \cdot T_s$ | | | — | — | — |
| 9 | $13168 \cdot T_s$ | | | — | — | — |

Figure 3:
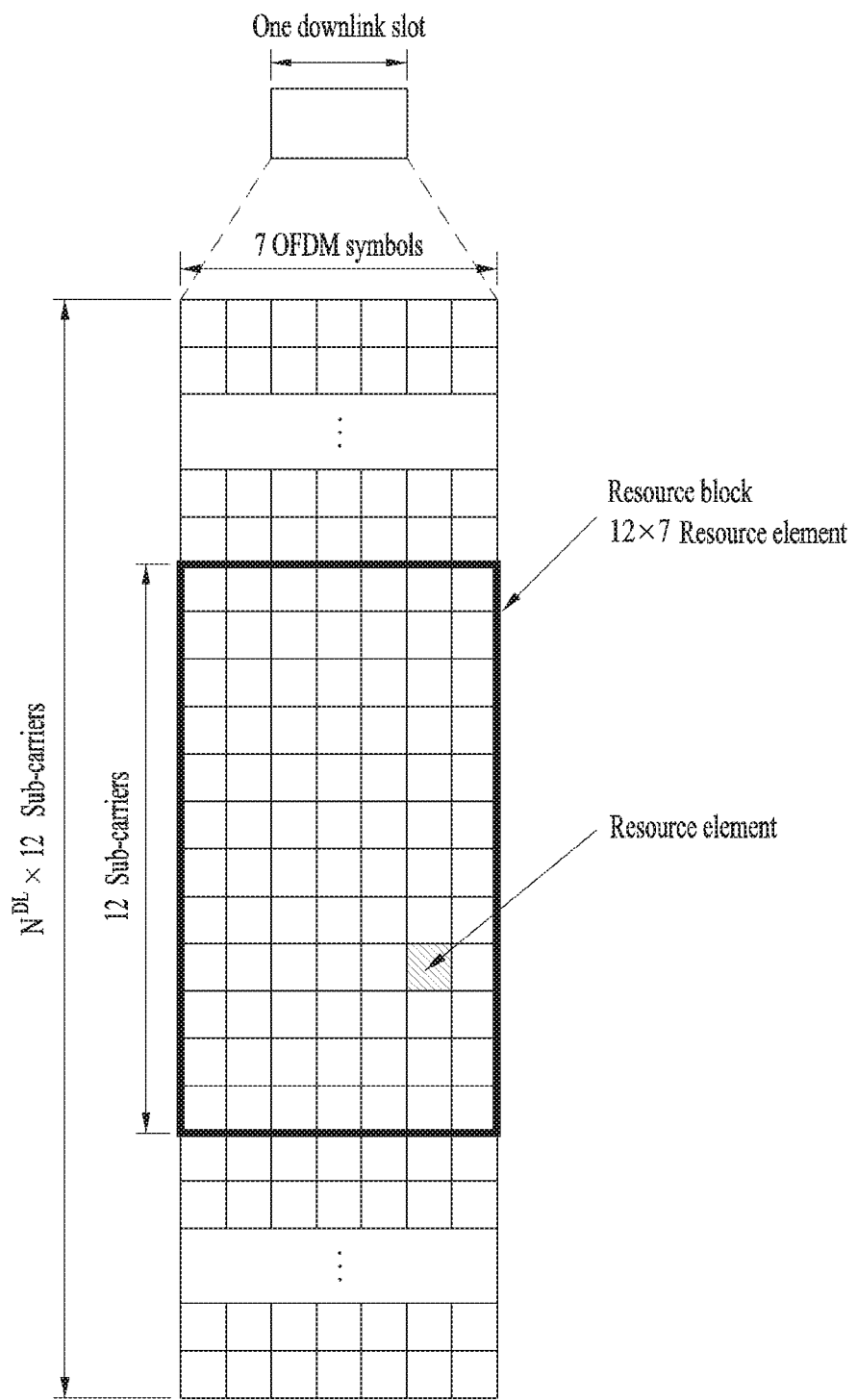
FIG. 3 is a diagram illustrating an exemplary resource grid for the duration of a downlink slot.

FIG. 3 illustrates an exemplary structure of a DL resource grid for the duration of one DL slot, which may be used in embodiments of the present disclosure.

Referring to FIG. 3, a DL slot includes a plurality of OFDM symbols in the time domain. One DL slot includes 7 OFDM symbols in the time domain and an RB includes 12 subcarriers in the frequency domain, to which the present disclosure is not limited.

Each element of the resource grid is referred to as a Resource Element (RE). An RB includes 12×7 REs. The number of RBs in a DL slot, NDL depends on a DL transmission bandwidth. The structure of the uplink slot may be the same as the structure of the downlink slot.

Figure 4:
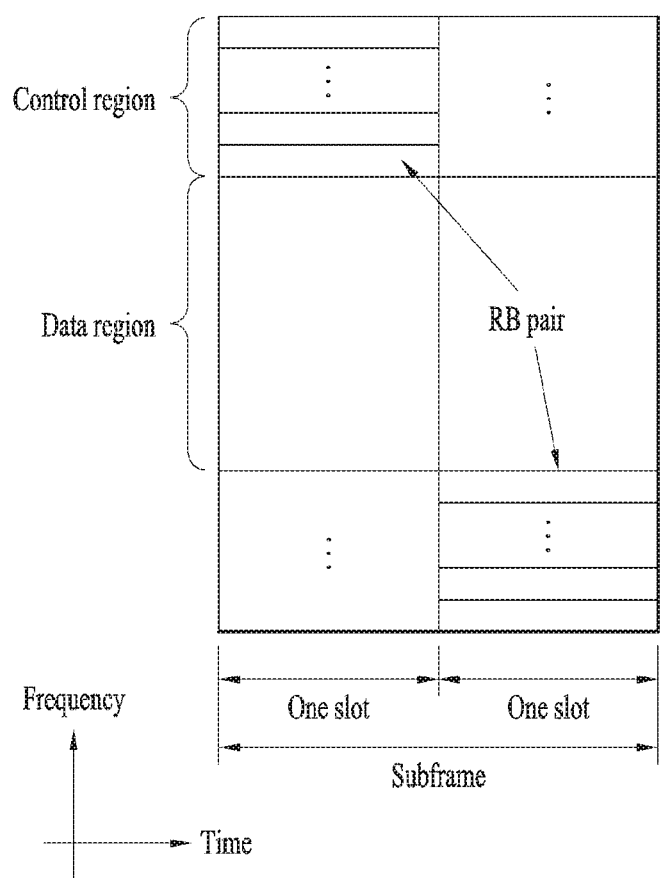
FIG. 4 is a diagram illustrating an exemplary structure of an uplink subframe.

FIG. 4 illustrates a structure of a UL subframe which may be used in embodiments of the present disclosure.

Referring to FIG. 4, a UL subframe may be divided into a control region and a data region in the frequency domain. A PUCCH carrying UCI is allocated to the control region and a PUSCH carrying user data is allocated to the data region. To maintain a single carrier property, a UE does not transmit a PUCCH and a PUSCH simultaneously. A pair of RBs in a subframe are allocated to a PUCCH for a UE. The RBs of the RB pair occupy different subcarriers in two slots. Thus it is said that the RB pair frequency-hops over a slot boundary.

Figure 5:
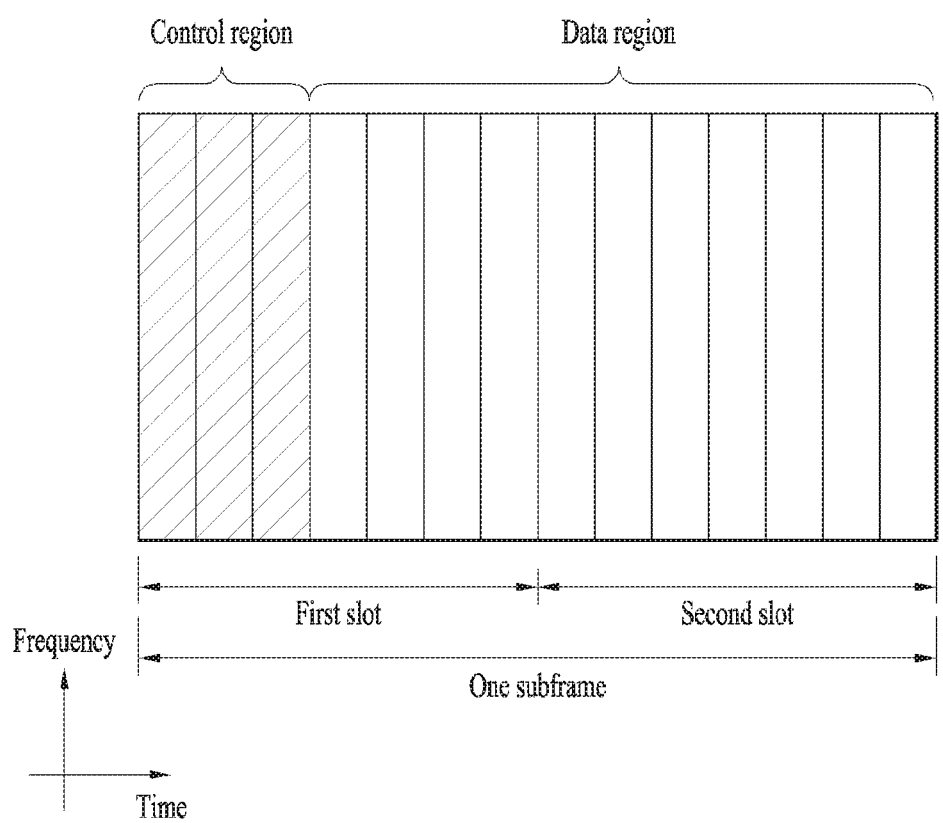
FIG. 5 is a diagram illustrating an exemplary structure of a downlink subframe.

FIG. 5 illustrates a structure of a DL subframe that may be used in embodiments of the present disclosure.

Referring to FIG. 5, up to three OFDM symbols of a DL subframe, starting from OFDM symbol 0 are used as a control region to which control channels are allocated and the other OFDM symbols of the DL subframe are used as a data region to which a PDSCH is allocated. DL control channels defined for the 3GPP LTE system include a Physical Control Format Indicator Channel (PCFICH), a PDCCH, and a Physical Hybrid ARQ Indicator Channel (PHICH).

The PCFICH is transmitted in the first OFDM symbol of a subframe, carrying information about the number of OFDM symbols used for transmission of control channels (i.e., the size of the control region) in the subframe. The PHICH is a response channel to a UL transmission, delivering an HARQ ACK/NACK signal. Control information carried on the PDCCH is called Downlink Control Information (DCI). The DCI transports UL resource assignment information, DL resource assignment information, or UL Transmission (Tx) power control commands for a UE group.

1.3. CSI Feedback

In the 3GPP LTE or LTE-A system, user equipment (UE) has been defined to report channel state information (CSI) to a base station (BS or eNB). Herein, the CSI refers to information indicating the quality of a radio channel (or link) formed between the UE and an antenna port.

For example, the CSI may include a rank indicator (RI), a precoding matrix indicator (PMI), and a channel quality indicator (CQI).

Here, RI denotes rank information about the corresponding channel, which means the number of streams that the UE receives through the same time-frequency resource. This value is determined depending on the channel's Long Term Fading. Subsequently, the RI may be fed back to the BS by the UE, usually at a longer periodic interval than the PMI or CQI.

The PMI is a value reflecting the characteristics of a channel space and indicates a precoding index preferred by the UE based on a metric such as SINR.

The CQI is a value indicating the strength of a channel, and generally refers to a reception SINR that can be obtained when the BS uses the PMI.

In the 3GPP LTE or LTE-A system, the base station may set a plurality of CSI processes for the UE, and receive a report of the CSI for each process from the UE. Here, the CSI process is configured with a CSI-RS for specifying signal quality from the base station and a CSI-interference measurement (CSI-IM) resource for interference measurement.

1.4. RRM Measurement

The LTE system supports Radio Resource Management (RRM) operation including power control, scheduling, cell search, cell reselection, handover, radio link or connection monitoring, and connection establishment/re-establishment. In this case, a serving cell may request a UE to send RRM measurement information, which contains measurement values for performing the RRM operation. As a representative example, in the LTE system, the UE may measure cell search information, Reference Signal Received Power (RSRP), Reference Signal Received Quality (RSRQ), etc. for each cell and then report the measured information. Specifically, in the LTE system, the UE receives 'measConfig' for the RRM measurement from the serving cell through a higher layer signal and then measure RSRP or RSRQ according to information in 'measConfig'.

In the LTE system, the RSRP, RSRQ, and RSSI has been defined as follows.

The RSRP is defined as the linear average over the power contributions (in [W]) of the resource elements that carry cell-specific reference signals within the considered measurement frequency bandwidth. For example, for RSRP determination, the cell-specific reference signals $R_0$ shall be used. For RSRP determination, the cell-specific reference signals $R_0$ shall be used. If the UE can reliably detect that $R_1$ is available, it may use $R_1$ in addition to $R_0$ to determine RSRP.

The reference point for the RSRP shall be the antenna connector of the UE.

If receiver diversity is in use by the UE, the reported value shall not be lower than the corresponding RSRP of any of the individual diversity branches.

The RSRQ is defined as the ratio N×RSRP/(E-UTRA carrier RSSI), where N is the number of RBs of the E-UTRA carrier RSSI measurement bandwidth. The measurements in the numerator and denominator shall be made over the same set of resource blocks.

The E-UTRA carrier RSSI comprises the linear average of the total received power (in [W]) observed only in OFDM symbols containing reference symbols for antenna port 0, in the measurement bandwidth, over N number of resource blocks by the UE from all sources, including co-channel serving and non-serving cells, adjacent channel interference, thermal noise etc. If higher-layer signaling indicates certain subframes for performing RSRQ measurements, then RSSI is measured over all OFDM symbols in the indicated subframes.

The reference point for the RSRQ shall be the antenna connector of the UE.

If receiver diversity is in use by the UE, the reported value shall not be lower than the corresponding RSRQ of any of the individual diversity branches.

The RSSI is defined as the received wide band power, including thermal noise and noise generated in the receiver, within the bandwidth defined by the receiver pulse shaping filter.

The reference point for the measurement shall be the antenna connector of the UE.

If receiver diversity is in use by the UE, the reported value shall not be lower than the corresponding UTRA carrier RSSI of any of the individual receive antenna branches.

Based on the above-described definitions, in the case of intra-frequency measurement, a UE operating in the LTE system may measure the RSRP in a bandwidth indicated by an allowed measurement bandwidth related information element (IE) transmitted in system information block type 3 (SIB3). Meanwhile, in the case of inter-frequency measurement, the UE may measure the RSRP in a bandwidth corresponding to one of 6, 15, 25, 50, 75, 100 resource blocks (RBs) indicated by an allowed measurement bandwidth related IE transmitted in SIBS. Alternatively, if there is no IE, the UE may measure the RSRP in the entire downlink (DL) system frequency bandwidth as the default operation.

Upon receiving information on the allowed measurement bandwidth, the UE may regard the corresponding value as the maximum measurement bandwidth and then freely measure the RSRP value within the corresponding value. However, if the serving cell transmits an IE defined as WB-RSRQ to the UE and sets the allowed measurement bandwidth to be equal to or greater than 50 RBs, the UE should calculate the RSRP value for the entire allowed measurement bandwidth. Meanwhile, when intending to the RSSI, the UE measures the RSSI using a frequency band of the UE's receiver according to the definition of RSSI bandwidth.

2. New Radio Access Technology System

As more and more communication devices require greater communication capacity, there is a need for mobile broadband communication enhanced over existing radio access technology (RAT). In addition, massive Machine-Type Communications (MTC) capable of providing a variety of services anywhere and anytime by connecting multiple devices and objects is also considered. Communication system design considering services/UEs sensitive to reliability and latency is also under discussion.

As such, introduction of new radio access technology considering enhanced mobile broadband communication, massive MTC, and Ultra-Reliable and Low Latency Communication (URLLC) is being discussed. In the present invention, for simplicity, this technology will be referred to as New RAT or NR (New Radio).

2.1. Self-contained Subframe Structure

Figure 6:
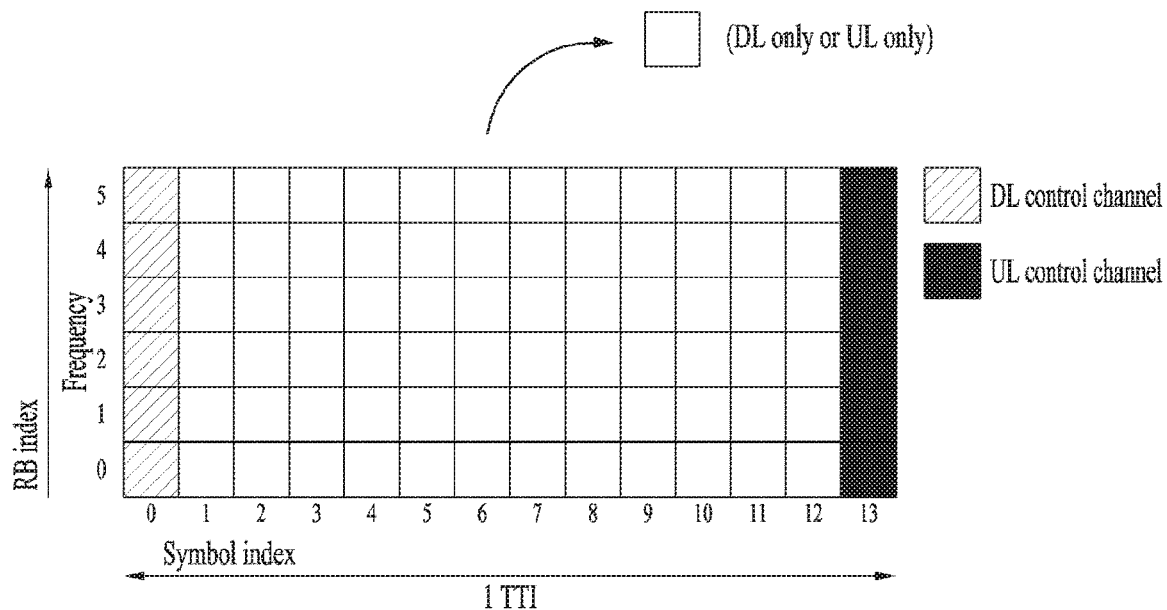
FIG. 6 is a diagram illustrating a self-contained subframe structure applicable to the present invention.

FIG. 6 is a diagram illustrating a self-contained subframe structure applicable to the present invention.

In the NR system to which the present invention is applicable, a self-contained subframe structure as shown in FIG. 6 is proposed in order to minimize data transmission latency in the TDD system.

In FIG. 6, the hatched region (e.g., symbol index=0) represents a downlink control region, and the black region (e.g., symbol index=13) represents an uplink control region. The other region (e.g., symbol index=1 to 12) may be used for downlink data transmission or for uplink data transmission.

In this structure, DL transmission and UL transmission may be sequentially performed in one subframe. In addition, DL data may be transmitted and received in one subframe and UL ACK/NACK therefor may be transmitted and received in the same subframe. As a result, this structure may reduce time taken to retransmit data when a data transmission error occurs, thereby minimizing the latency of final data transmission.

In such a self-contained subframe structure, a time gap having a certain temporal length is required in order for the base station and the UE to switch from the transmission mode to the reception mode or from the reception mode to the transmission mode. To this end, some OFDM symbols at the time of switching from DL to UL in the self-contained subframe structure may be set as a guard period (GP).

While a case where the self-contained subframe structure includes both the DL control region and the UL control region has been described above, the control regions may be selectively included in the self-contained subframe structure. In other words, the self-contained subframe structure according to the present invention may include not only the case of including both the DL control region and the UL control region but also the case of including either the DL control region or the UL control region alone, as shown in FIG. 6.

For simplicity of explanation, the frame structure configured as above is referred to as a subframe, but this configuration can also be referred to as a frame or a slot. For example, in the NR system, one unit consisting of a plurality of symbols may be referred to as a slot. In the following description, a subframe or a frame may be replaced with the slot described above.

2.2. OFDM Numerology

The NR system uses the OFDM transmission scheme or a similar transmission scheme. The NR system uses the OFDM transmission scheme or a similar transmission scheme. The NR system typically includes an OFDM numerology as shown in Table 2. For convenience of description, a configuration of Table 2 will be referred to as a numerology.

TABLE 2

| Parameter | Value |
|---|---|
| Subcarrier-spacing (Δf) | 75 kHz |
| OFDM symbol length | 13.33 μs |
| Cyclic Prefix (CP) length | 1.04 μs/0.94 μs |
| System BW | 100 MHz |
| No. of available subcarriers | 1200 |
| Subframe length | 0.2 ms |
| Number of OFDM symbol per Subframe | 14 symbols |

Alternatively, the NR system may use the OFDM transmission scheme or a similar transmission scheme, and may use an OFDM numerology selected from among multiple OFDM numerologies as shown in Table 3. Specifically, as disclosed in Table 3, the NR system may take the 15 kHz subcarrier-spacing used in the LTE system as a base, and use an OFDM numerology having subcarrier-spacing of 30, 60, and 120 kHz, which are multiples of the 15 kHz subcarrier-spacing.

In this case, the cyclic prefix, the system bandwidth (BW) and the number of available subcarriers disclosed in Table 3 are merely an example that is applicable to the NR system according to the present invention, and the values thereof may depend on the implementation method. Typically, for the 60 kHz subcarrier-spacing, the system bandwidth may be set to 100 MHz. In this case, the number of available subcarriers may be greater than 1500 and less than 1666. Also, the subframe length and the number of OFDM symbols per subframe disclosed in Table 3 are merely an example that is applicable to the NR system according to the present invention, and the values may depend on the implementation method.

However, installing TXRUs in all of the about 100 antenna elements is less feasible in terms of cost. Therefore, a method of mapping a plurality of antenna elements to one TXRU and adjusting the direction of a beam using an analog phase shifter has been considered. However, this method is disadvantageous in that frequency selective beamforming is impossible because only one beam direction is generated over the full band.

To solve this problem, as an intermediate form of digital BF and analog BF, hybrid BF with B TXRUs that are fewer than Q antenna elements can be considered. In the case of the hybrid BF, the number of beam directions that can be transmitted at the same time is limited to B or less, which depends on how B TXRUs and Q antenna elements are connected.

Figure 7:
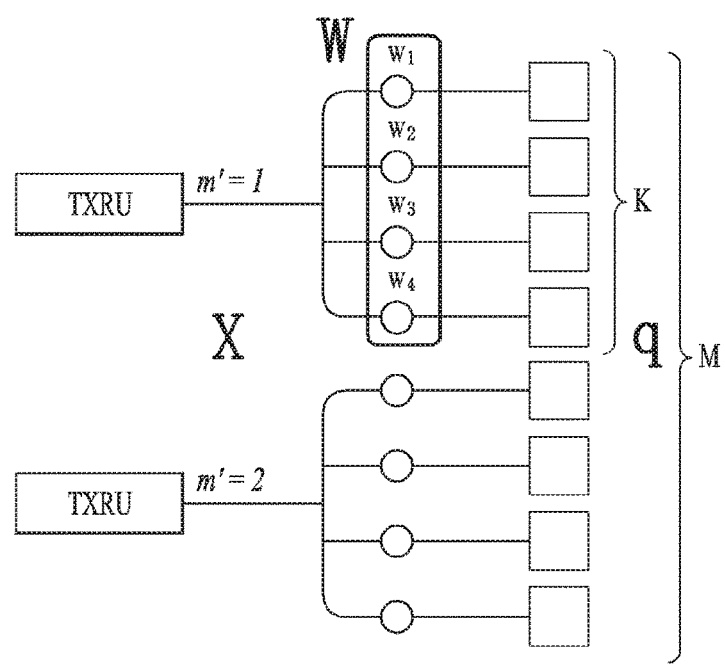
FIGS. 7 and 8 are diagrams illustrating representative methods for connecting TXRUs to antenna elements.
Figure 8:
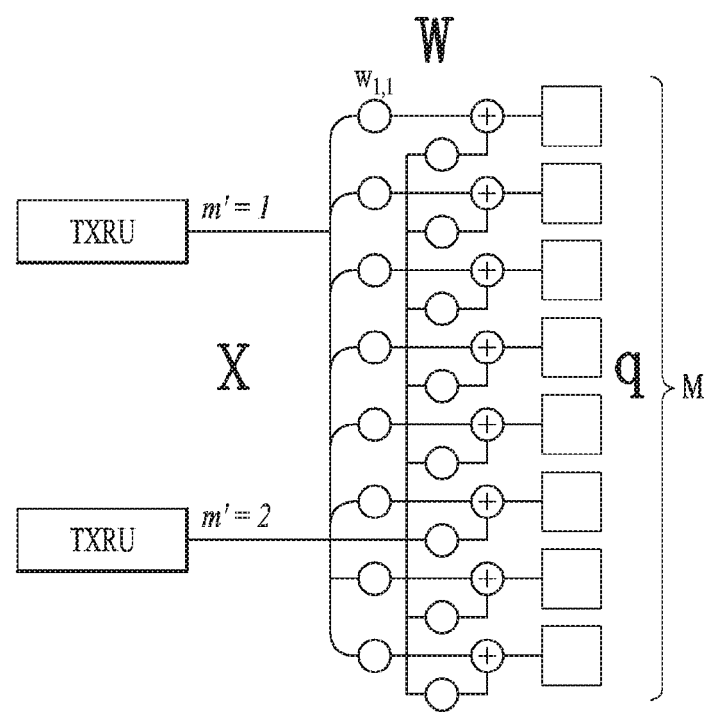

FIGS. 7 and 8 are diagrams illustrating representative methods for connecting TXRUs to antenna elements. Here, the TXRU virtualization model represents the relationship between TXRU output signals and antenna element output signals.

FIG. 7 shows a method for connecting TXRUs to sub-arrays. In FIG. 7, one antenna element is connected to one TXRU.

Meanwhile, FIG. 8 shows a method for connecting all TXRUs to all antenna elements. In FIG. 8, all antenna element are connected to all TXRUs. In this case, separate addition units are required to connect all antenna elements to all TXRUs as shown in FIG. 8.

In FIGS. 7 and 8, W indicates a phase vector weighted by an analog phase shifter. That is, W is a major parameter determining the direction of the analog beamforming. In this case, the mapping relationship between CSI-RS antenna ports and TXRUs may be 1:1 or 1-to-many.

The configuration shown in FIG. 7 has a disadvantage in that it is difficult to achieve beamforming focusing but has an advantage in that all antennas can be configured at low cost.

TABLE 3

| Parameter | Value | Value | Value | Value |
|---|---|---|---|---|
| Subcarrier-spacing (Δf) | 15 kHz | 30 kHz | 60 kHz | 120 kHz |
| OFDM symbol length | 66.66 | 33.33 | 16.66 | 8.33 |
| Cyclic Prefix (CP) length | 5.20 μs/4.69 μs | 2.60 μs/2.34 μs | 1.30 μs/1.17 μs | 0.65 μs/0.59 μs |
| System BW | 20 MHz | 40 MHz | 80 MHz | 160 MHz |
| No. of available subcarriers | 1200 | 1200 | 1200 | 1200 |
| Subframe length | 1 ms | 0.5 ms | 0.25 ms | 0.125 ms |
| Number of OFDM symbol per Subframe | 14 symbols | 14 symbols | 14 symbols | 14 symbols |

2.3. Analog Beamforming

In a millimeter wave (mmW) system, since a wavelength is short, a plurality of antenna elements can be installed in the same area. That is, considering that the wavelength at 30 GHz band is 1 cm, a total of 100 antenna elements can be installed in a 5*5 cm panel at intervals of 0.5 lambda (wavelength) in the case of a 2-dimensional array. Therefore, in the mmW system, it is possible to improve the coverage or throughput by increasing the beamforming (BF) gain using multiple antenna elements.

In this case, each antenna element can include a transceiver unit (TXRU) to enable adjustment of transmit power and phase per antenna element. By doing so, each antenna element can perform independent beamforming per frequency resource.

On the contrary, the configuration shown in FIG. 8 is advantageous in that beamforming focusing can be easily achieved. However, since all antenna elements are connected to the TXRU, it has a disadvantage of high cost.

When a plurality of antennas is used in the NR system to which the present invention is applicable, a hybrid beamforming (BF) scheme in which digital BF and analog BF are combined may be applied. In this case, analog BF (or radio frequency (RF) BF) means an operation of performing precoding (or combining) at an RF stage. In hybrid BF, each of a baseband stage and the RF stage perform precoding (or combining) and, therefore, performance approximating to digital BF can be achieved while reducing the number of RF chains and the number of a digital-to-analog (D/A) (or analog-to-digital (A/D) converters.

For convenience of description, a hybrid BF structure may be represented by N transceiver units (TXRUs) and M physical antennas. In this case, digital BF for L data layers to be transmitted by a transmission end may be represented by an N-by-L matrix. N converted digital signals obtained thereafter are converted into analog signals via the TXRUs and then subjected to analog BF, which is represented by an M-by-N matrix.

Figure 9:
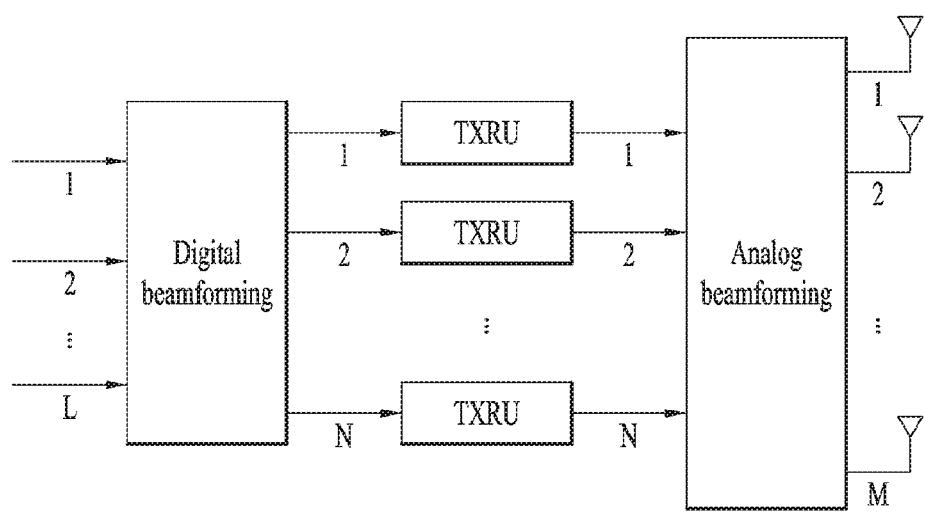
FIG. 9 is a diagram schematically illustrating an exemplary hybrid beamforming structure from the perspective of transceiver units (TXRUs) and physical antennas according to the present invention.

FIG. 9 is a diagram schematically illustrating an exemplary hybrid BF structure from the perspective of TXRUs and physical antennas according to the present invention. In FIG. 9, the number of digital beams is L and the number analog beams is N.

Additionally, in the NR system to which the present invention is applicable, an eNB designs analog BF to be changed in units of symbols to provide more efficient BF support to a UE located in a specific area. Furthermore, as illustrated in FIG. 9, when N specific TXRUs and M RF antennas are defined as one antenna panel, the NR system according to the present invention considers introducing a plurality of antenna panels to which independent hybrid BF is applicable.

In the case in which the eNB utilizes a plurality of analog beams as described above, the analog beams advantageous for signal reception may differ according to a UE. Therefore, in the NR system to which the present invention is applicable, a beam sweeping operation is being considered in which the eNB transmits signals (at least synchronization signals, system information, paging, and the like) by applying different analog beams in a specific subframe (SF) on a symbol-by-symbol basis so that all UEs may have reception opportunities.

Figure 10:
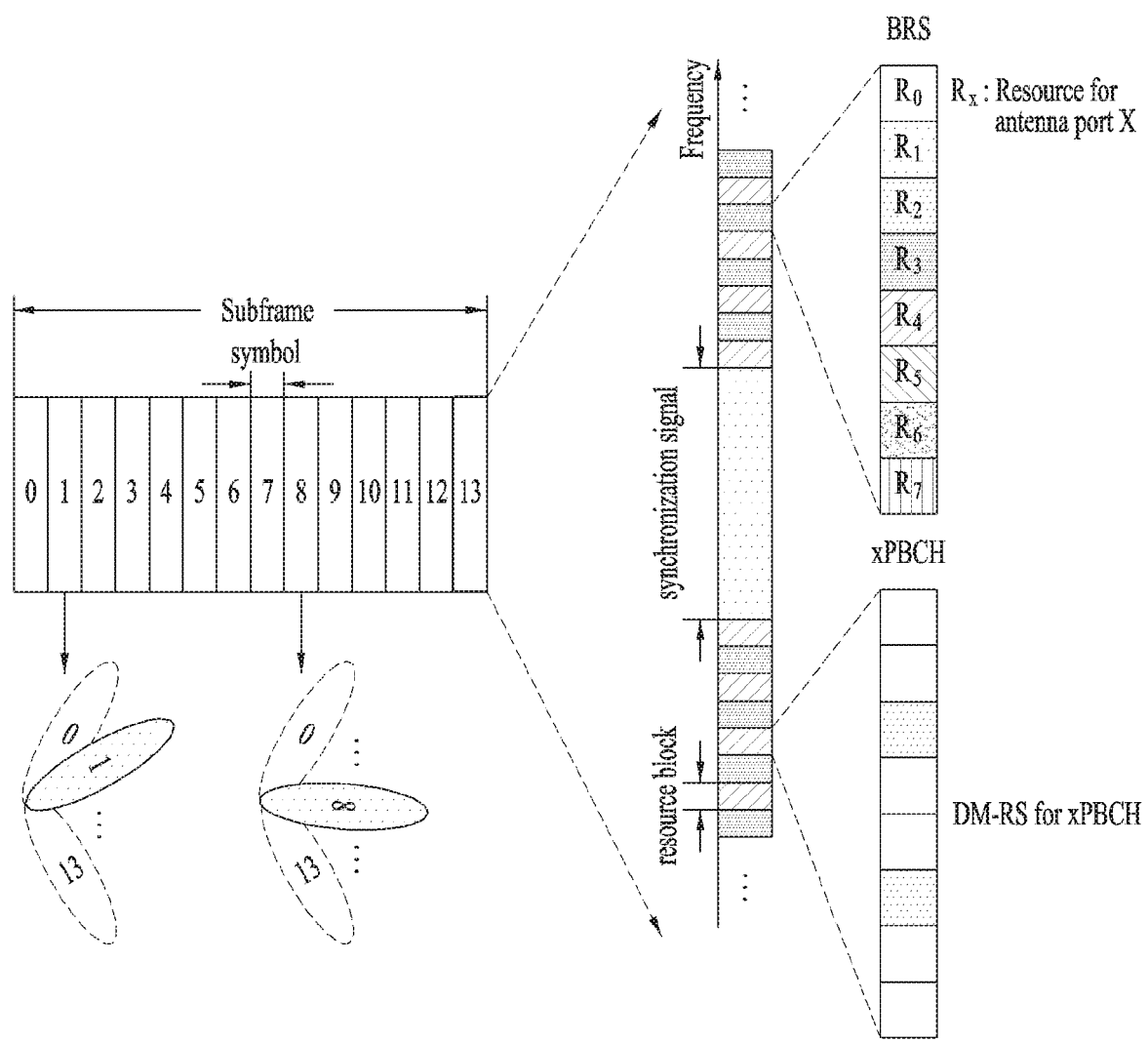
FIG. 10 is a diagram schematically illustrating an exemplary beam sweeping operation for a synchronization signal and system information in a downlink (DL) transmission procedure according to the present invention.

FIG. 10 is a diagram schematically illustrating an exemplary beam sweeping operation for a synchronization signal and system information in a DL transmission procedure according to the present invention.

In FIG. 10 below, a physical resource (or physical channel) on which the system information of the NR system to which the present invention is applicable is transmitted in a broadcasting manner is referred to as an xPBCH. Here, analog beams belonging to different antenna panels within one symbol may be simultaneously transmitted.

As illustrated in FIG. 10, in order to measure a channel for each analog beam in the NR system to which the present invention is applicable, introducing a beam RS (BRS), which is a reference signal (RS) transmitted by applying a single analog beam (corresponding to a specific antenna panel), is being discussed. The BRS may be defined for a plurality of antenna ports and each antenna port of the BRS may correspond to a single analog beam. In this case, unlike the BRS, a synchronization signal or the xPBCH may be transmitted by applying all analog beams in an analog beam group such that any UE may receive the signal well.

Hereinafter, methods by which a terminal (e.g., UE) transmits uplink signals to a base station (e.g., gNB) will be described in detail based on the above technical features. Specifically, methods of multiplexing uplink channels/signals and scheduling and HARQ operation methods based on a frame structure applicable to the NR system will be explained in detail.

3. Method of Multiplexing Uplink Channels/Signals

In the NR system to which the present disclosure is applicable, a Physical Uplink Control Channel (PUCCH) carrying an Uplink Control Indicator (UCI) including HARQ-ACK, Channel State Information (CSI), beam-related information, Scheduling Request (SR) related information can be defined.

Figure 11:
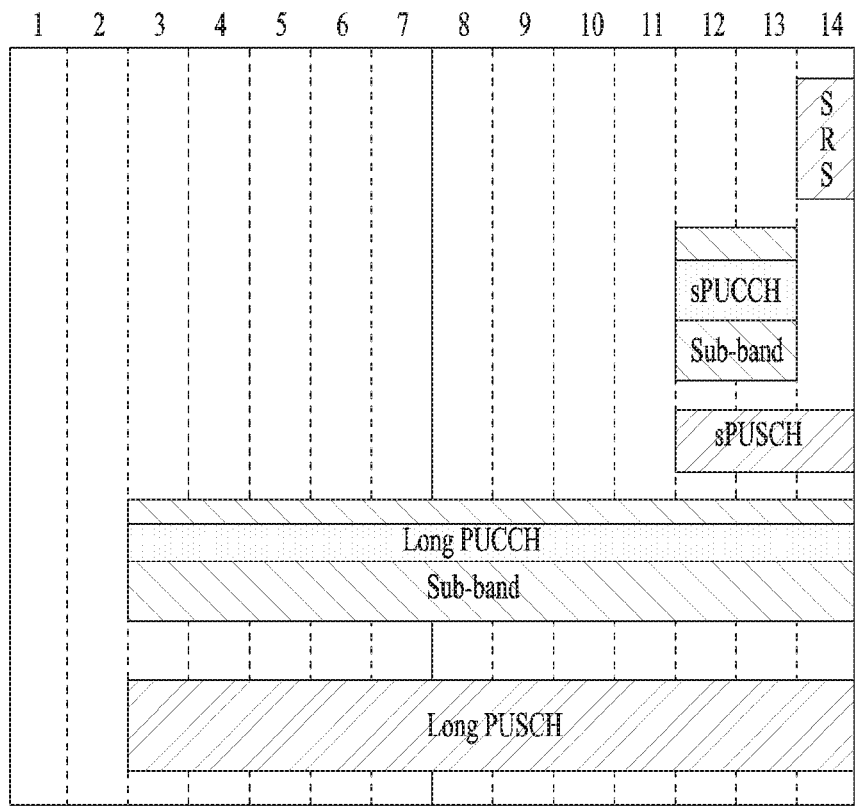
FIG. 11 is a diagram schematically illustrating a configuration for transmitting various channels that can be supported by the NR system to which the present disclosure is applicable.

FIG. 11 schematically illustrates a configuration for transmitting various channels that can be supported by the NR system to which the present disclosure is applicable. Specifically, FIG. 11 shows various channels that can be transmitted in one slot composed of 14 symbols.

As shown in FIG. 11, the following channels and signal can be transmitted in one slot composed of 14 (or 7) symbols: a relatively short PUCCH composed of 1 or 2 symbols (referred to as a sPUCCH); a relatively long PUCCH composed of 3 (or 4) or more symbols (referred to as a long PUCCH); a relatively short PUSCH composed of a relatively small number of symbols (e.g., 3 symbols or less) (referred to as a sPUSCH); a relatively long PUSCH composed of a relatively large number of symbols (e.g., 4 symbols or more) (referred to as a long PUSCH); and a Sounding Reference Signal (SRS) composed of 1 to 4 symbols for uplink (UL) channel estimation.

In FIG. 11, as a resource region where the sPUCCH can be allocated, the sub-band of the sPUCCH or long PUCCH may be configured cell-specifically or UE-specifically, and the sPUCCH or long PUCCH may be frequency-hopped in the subband.

In addition, a frequency region for the one slot shown in FIG. 11 may be composed of one or a plurality of subcarriers. More specifically, the sPUCCH, long PUCCH, sPUSCH, long PUSCH, and SRS shown in FIG. 11 may be transmitted on one subcarrier, or they may be transmitted on different subcarriers, respectively.

Hereinafter, signal multiplexing methods between an SRS (s), a sPUCCH(s), a sPUSCH(s), a long PUCCH(s), and/or a long PUSCH(s) in the NR system to which the present disclosure is applicable will be described in detail.

3.1. Method Performed by UE for Multiplexing Between Short and Long Channels In the present disclosure, a long channel may mean a long PUCCH or a long PUSCH, and a short channel may mean a sPUCCH, a sPUSCH, or an SRS. In this section, methods of multiplexing short and long channels when the short and long channels coexist in one same slot (or time period) from the perspective of a single UE will be described in detail.

3.1.1. First Multiplexing Method

In this section, a method of multiplexing short and long channels by prioritizing the long channel over the short channel is proposed. In other words, the first multiplexing method for a UE relates to a method of multiplexing short and long channels such that the long channel is to be transmitted with higher transmission reliability than the short channel.

3.1.1.1. First Case (when Only Time Resources Overlap Between Short and Long Channels, that is, when there is No Frequency Resource Overlapping Between Two Channels)

When a UE has the simultaneous transmission capability, the UE may transmit short and long channels at the same time if there is no frequency resource overlapping between the two channels. In this case, since the maximum transmission power (e.g., P_max) allowed for the UE in a specific frequency band may be limited to a certain value, the sum of short-channel transmission power and long-channel transmission power in a specific resource region (e.g., a resource region corresponding to one or a plurality of subcarriers in one or a plurality of symbol periods) may be higher than the maximum transmission power allowed for the UE in the corresponding frequency band. Hereinafter, the above case is named a power-limited case for convenience of description. In the power-limited case, the UE may use the following method in order to multiplex and transmit the short and long channels with power equal to or less than the maximum transmission power.

For example, the UE may transmit the two channels with power equal to or less than P_max during a symbol period, where the two channels overlap, by decreasing the power value for the short channel (i.e., power scale down).

The UE may apply the above multiplexing method only when the modulation order of the short channel is Quadrature Phase Shift Keying (QPSK) or Binary Phase Shift Keying (BPSK). In other words, when the modulation order of the short channel is Quadrature Amplitude Modulation (QAM), the UE may not apply the above multiplexing method.

Alternatively, the UE may scale down the transmission power over all symbols of the short channel with the same rate or scale down the transmission power only in the symbols where the two channels overlap with a certain rate.

In this case, if the transmission power value for the short channel decreases during the overlapping symbol period, a gNB may be unable to accurately estimate the short channel using an existing DM-RS only. Thus, the UE may transmit an additional DM-RS in some of the symbols where the two channels overlap. For example, the UE may transmit the additional DM-RS only when the modulation order of the short channel is QAM. Alternatively, the number of symbols constituting the short channel is equal to or more than a predetermined value (e.g., X), the UE may transmit the additional DM-RS as described above.

As another example, the UE may perform puncturing on all symbol of the short channel, the overlapping symbols of the short channel, or all symbols after the overlapping symbols of the short channel More specifically, by performing the puncturing on all symbols of the short channel or some symbols thereof (e.g., some of the overlapping symbols, all symbols after the overlapping symbols, etc.), the UE may control the transmission power such that it does not exceed P_max during the symbol period where the two channels overlap. As an applicable example, when the number of symbols constituting the short channel is equal to or more than a predetermined value (e.g., Y), the UE may puncture only the symbols of the short channel, where the two channels overlap. On the contrary, when the number of symbols constituting the short channel is less than the predetermined value, the UE may puncture all symbols of the short channel.

As still another example, the UE may perform the puncturing only on some subcarriers (Resource Element (REs) or Resource Blocks (RBs), each of which is composed of 12 REs) in the overlapping symbols of the short channel. In other words, the UE may perform the puncturing only on some REs in the overlapping symbols of the short channel other than during a specific symbol period thereof.

Only when the modulation scheme or waveform applied to the short channel is Cyclic Prefix-OFDM (CP-OFDM), the UE may use the above multiplexing method, that is, control the transmission power to be equal to or less than P_max by puncturing a minimum number of REs or RBs, which are determined according to a predetermined rule, among REs or RBs allocated to the symbols where the two channels overlap.

In this case, a variety of methods can be used to determine the REs or RBs to be punctured in the symbol period where the two channels overlap. For example, the UE may puncture a minimum number of REs/RBs/RB groups, which are determined in ascending (or descending) order of the indices of resources allocated to the overlapping symbols.

As a further example, if a DM-RS is transmitted in some REs, the UE may perform the puncturing only on REs where the DM-RS is not transmitted. More specifically, a DM-RS may be transmitted in some of all the PUSCH symbols. For example, a DM-RS may be transmitted in the first symbol among symbols (e.g., 14 symbols) where a PUSCH is configured. In this case, the DM-RS may be transmitted in some REs in the first symbol rather than all REs therein (for example, in REs spaced at intervals of 1 or 3 REs as in a comb structure). At this time, if the UE intends to puncture the last symbol of the PUSCH since the last symbol of the PUSCH overlaps with another channel (e.g., sPUCCH), the UE may perform the puncturing only on REs of the last symbol, which are located in frequency bands where no DM-RS is transmitted, by more concerning REs of the last symbol, which are located in frequency bands where the DM-RS is transmitted.

As still a further example, the UE may exclude REs including data that may cause serious problems in data decoding due to the characteristics of channel coding (e.g., polar coding) applied to data included in the REs to be punctured and then perform the puncturing on the remaining REs.

In the above configuration, the UE may perform rate-matching instead of the puncturing operation.

The above-described various multiplexing methods can be applied not only to the UE's power-limited case but also under other conditions (e.g., gNB's configuration, etc.).

3.1.1.2. Second Case (when not Only Time Resources but Frequency Resources Overlap Between Short and Long Channels)

When time and frequency resources overlap between two channels in contrast to section 3.1.1.1, physical REs/RBs may overlap between the two channels. To transmit the two channels where the physical REs/RBs overlap, a UE may consider use of the following two methods.

(1) Application of puncturing to the overlapping resources of the short channel at the RE/RB level (2) Application of puncturing to the overlapping resources of the short channel at the symbol level The method corresponding to (1) can be applied as follows: if the waveform of the short channel is Discrete Fourier Transform-spread-OFDM (DFT-s-OFDM), the DFT can be performed on the short channel after reducing the size of the DFT as many as the number of punctured REs/RBs.

The method corresponding to (2) can be applied only when the waveform of the short channel is DFT-s-OFDM. In other words, if the waveform of the short channel is CP-OFDM, only the method corresponding to (1) can be applied.

After the method corresponding to (1) and/or (2) is applied, the various multiplexing methods between short and long channels described in section 3.1.1.1 can be applied. Hereinafter, details will be described.

For example, the UE may transmit the two channels with power equal to or less than P_max during a symbol period, where the two channels overlap, by decreasing the power value for the short channel (i.e., power scale down).

The UE may apply the above multiplexing method only when the modulation order of the short channel is QPSK or BPSK. In other words, when the modulation order of the short channel is QAM, the UE may not apply the above multiplexing method.

Alternatively, the UE may scale down the transmission power over all symbols of the short channel with the same rate or scale down the transmission power only in the symbols where the two channels overlap with a certain rate.

In this case, if the transmission power value for the short channel decreases during the overlapping symbol period, a gNB may be unable to accurately estimate the short channel using an existing DM-RS only. Thus, the UE may transmit an additional DM-RS in some of the symbols where the two channels overlap. For example, the UE may transmit the additional DM-RS only when the modulation order of the short channel is QAM. Alternatively, the number of symbols constituting the short channel is equal to or more than a predetermined value (e.g., X), the UE may transmit the additional DM-RS as described above.

As another example, the UE may perform puncturing on all symbol of the short channel, the overlapping symbols of the short channel, or all symbols after the overlapping symbols of the short channel More specifically, by performing the puncturing on all symbols of the short channel or some symbols thereof (e.g., some of the overlapping symbols, all symbols after the overlapping symbols, etc.), the UE may control the transmission power such that it does not exceed P_max during the symbol period where the two channels overlap. As an applicable example, when the number of symbols constituting the short channel is equal to or more than a predetermined value (e.g., Y), the UE may puncture only the symbols of the short channel, where the two channels overlap. On the contrary, when the number of symbols constituting the short channel is less than the predetermined value, the UE may puncture all symbols of the short channel.

As still another example, the UE may perform the puncturing only on some subcarriers (REs or RBs, each of which is composed of 12 REs) in the overlapping symbols of the short channel. In other words, the UE may perform the puncturing only on some REs in the overlapping symbols of the short channel other than during a specific symbol period thereof.

Only when the modulation scheme or waveform applied to the short channel is CP-OFDM, the UE may use the above multiplexing method, that is, control the transmission power to be equal to or less than P_max by puncturing a minimum number of REs or RBs, which are determined according to a predetermined rule, among REs or RBs allocated to the symbols where the two channels overlap.

In this case, a variety of methods can be used to determine the REs or RBs to be punctured in the symbol period where the two channels overlap. For example, the UE may puncture a minimum number of REs/RBs/RB groups, which are determined in ascending (or descending) order of the indices of resources allocated to the overlapping symbols.

As a further example, if a DM-RS is transmitted in some REs, the UE may perform the puncturing only on REs where the DM-RS is not transmitted. More specifically, a DM-RS may be transmitted in some of all the PUSCH symbols. For example, a DM-RS may be transmitted in the first symbol among symbols (e.g., 14 symbols) where a PUSCH is configured. In this case, the DM-RS may be transmitted in some REs in the first symbol rather than all REs therein (for example, in REs spaced at intervals of 1 or 3 REs as in a comb structure). At this time, if the UE intends to puncture the last symbol of the PUSCH since the last symbol of the PUSCH overlaps with another channel (e.g., sPUCCH), the UE may perform the puncturing only on REs of the last symbol, which are located in frequency bands where no DM-RS is transmitted, by more concerning REs of the last symbol, which are located in frequency bands where the DM-RS is transmitted.

As still a further example, the UE may exclude REs including data that may cause serious problems in data decoding due to the characteristics of channel coding (e.g., polar coding) applied to data included in the REs to be punctured and then perform the puncturing on the remaining REs.

In the above configuration, the UE may perform rate-matching instead of the puncturing operation.

The above-described various multiplexing methods can be applied not only to the UE's power-limited case but also under other conditions (e.g., gNB's configuration, etc.).

3.1.2. Second Multiplexing Method

In this section, a method of multiplexing short and long channels by prioritizing the short channel over the long channel is proposed. In other words, the second multiplexing method for a UE relates to a method of multiplexing short and long channels such that the short channel is transmitted with higher transmission reliability than the long channel.

3.1.2.1. First Case (when Only Time Resources Overlap Between Short and Long Channels, that is, when there is No Frequency Resource Overlapping Between Two Channels)

When a UE has the simultaneous transmission capability, the UE may transmit short and long channels at the same time if there is no frequency resource overlapping between the two channels. In this case, since the maximum transmission power (e.g., P_max) allowed for the UE in a specific frequency band may be limited to a certain value, the sum of short-channel transmission power and long-channel transmission power in a specific resource region (e.g., a resource region corresponding to one or a plurality of subcarriers in one or a plurality of symbol periods) may be higher than the maximum transmission power allowed for the UE in the corresponding frequency band. In this case, the UE may use the following method in order to multiplex and transmit the short and long channels with power equal to or less than the maximum transmission power.

For example, the UE may transmit the two channels with power equal to or less than P_max during a symbol period, where the two channels overlap, by decreasing the power value for the long channel (i.e., power scale down).

The UE may apply the above multiplexing method only when the modulation order of the long channel is QPSK or BPSK. In other words, when the modulation order of the long channel is QAM, the UE may not apply the above multiplexing method.

Alternatively, the UE may scale down the transmission power over all symbols of the long channel with the same rate or scale down the transmission power only in the symbols where the two channels overlap with a certain rate.

In this case, if the transmission power value for the long channel decreases during the overlapping symbol period, a gNB may be unable to accurately estimate the long channel using an existing DM-RS only. Thus, the UE may transmit an additional DM-RS in some of the symbols where the two channels overlap. For example, the UE may transmit the additional DM-RS only when the modulation order of the long channel is QAM.

As another example, the UE may perform puncturing on all symbol of the long channel, the overlapping symbols of the long channel, or all symbols after the overlapping symbols of the long channel More specifically, by performing the puncturing on all symbols of the long channel or some symbols thereof (e.g., some of the overlapping symbols, all symbols after the overlapping symbols, etc.), the UE may control the transmission power such that it does not exceed P_max during the symbol period where the two channels overlap.

As still another example, the UE may perform the puncturing only on some subcarriers (REs or RBs, each of which is composed of 12 REs) in the overlapping symbols of the long channel. In other words, the UE may perform the puncturing only on some REs in the overlapping symbols of the long channel other than during a specific symbol period thereof.

Only when the modulation scheme or waveform applied to the long channel is CP-OFDM, the UE may use the above multiplexing method, that is, control the transmission power to be equal to or less than P_max by puncturing a minimum number of REs or RBs, which are determined according to a predetermined rule, among REs or RBs allocated to the symbols where the two channels overlap.

In this case, a variety of methods can be used to determine the REs or RBs to be punctured in the symbol period where the two channels overlap. For example, the UE may puncture a minimum number of REs/RBs/RB groups, which are determined in ascending (or descending) order of the indices of resources allocated to the overlapping symbols.

As a further example, if a DM-RS is transmitted in some REs, the UE may perform the puncturing only on REs where the DM-RS is not transmitted. More specifically, a DM-RS may be transmitted in some of all the PUSCH symbols. For example, a DM-RS may be transmitted in the first symbol among symbols (e.g., 14 symbols) where a PUSCH is configured. In this case, the DM-RS may be transmitted in some REs in the first symbol rather than all REs therein (for example, in REs spaced at intervals of 1 or 3 REs as in a comb structure). At this time, if the UE intends to puncture the last symbol of the PUSCH since the last symbol of the PUSCH overlaps with another channel (e.g., sPUCCH), the UE may perform the puncturing only on REs of the last symbol, which are located in frequency bands where no DM-RS is transmitted, by more concerning REs of the last symbol, which are located in frequency bands where the DM-RS is transmitted.

As still a further example, the UE may exclude REs including data that may cause serious problems in data decoding due to the characteristics of channel coding (e.g., polar coding) applied to data included in the REs to be punctured and then perform the puncturing on the remaining REs.

In the above configuration, the UE may perform rate-matching instead of the puncturing operation.

The above-described various multiplexing methods can be applied not only to the UE's power-limited case but also under other conditions (e.g., gNB's configuration, etc.).

3.1.2.2. Second Case (when not Only Time Resources but Frequency Resources Overlap Between Short and Long Channels)

When time and frequency resources overlap between two channels in contrast to section 3.1.2.1, physical REs/RBs may overlap between the two channels. To transmit the two channels where the physical REs/RBs overlap, a UE may consider use of the following two methods.

(1) Application of puncturing to the overlapping resources of the long channel at the RE/RB level (2) Application of puncturing to the overlapping resources of the long channel at the symbol level The method corresponding to (1) can be applied as follows: if the waveform of the long channel is DFT-s-OFDM, the DFT can be performed on the long channel after reducing the size of the DFT as many as the number of punctured REs/RBs.

The method corresponding to (2) can be applied only when the waveform of the long channel is DFT-s-OFDM. In other words, if the waveform of the long channel is CP-OFDM, only the method corresponding to (1) can be applied.

After the method corresponding to (1) and/or (2) is applied, the various multiplexing methods between short and long channels described in section 3.1.2.1 can be applied. Hereinafter, details will be described.

For example, the UE may transmit the two channels with power equal to or less than P_max during a symbol period, where the two channels overlap, by decreasing the power value for the long channel (i.e., power scale down).

The UE may apply the above multiplexing method only when the modulation order of the long channel is QPSK or BPSK. In other words, when the modulation order of the long channel is QAM, the UE may not apply the above multiplexing method.

Alternatively, the UE may scale down the transmission power over all symbols of the long channel with the same rate or scale down the transmission power only in the symbols where the two channels overlap with a certain rate.

In this case, if the transmission power value for the long channel decreases during the overlapping symbol period, a gNB may be unable to accurately estimate the long channel using an existing DM-RS only. Thus, the UE may transmit an additional DM-RS in some of the symbols where the two channels overlap. For example, the UE may transmit the additional DM-RS only when the modulation order of the long channel is QAM.

As another example, the UE may perform puncturing on all symbol of the long channel, the overlapping symbols of the long channel, or all symbols after the overlapping symbols of the long channel More specifically, by performing the puncturing on all symbols of the long channel or some symbols thereof (e.g., some of the overlapping symbols, all symbols after the overlapping symbols, etc.), the UE may control the transmission power such that it does not exceed P_max during the symbol period where the two channels overlap.

As still another example, the UE may perform the puncturing only on some subcarriers (REs or RBs, each of which is composed of 12 REs) in the overlapping symbols of the long channel. In other words, the UE may perform the puncturing only on some REs in the overlapping symbols of the long channel other than during a specific symbol period thereof.

Only when the modulation scheme or waveform applied to the long channel is CP-OFDM, the UE may use the above multiplexing method, that is, control the transmission power to be equal to or less than P_max by puncturing a minimum number of REs or RBs, which are determined according to a predetermined rule, among REs or RBs allocated to the symbols where the two channels overlap.

In this case, a variety of methods can be used to determine the REs or RBs to be punctured in the symbol period where the two channels overlap. For example, the UE may puncture a minimum number of REs/RBs/RB groups, which are determined in ascending (or descending) order of the indices of resources allocated to the overlapping symbols.

As a further example, if a DM-RS is transmitted in some REs, the UE may perform the puncturing only on REs where the DM-RS is not transmitted. More specifically, a DM-RS may be transmitted in some of all the PUSCH symbols. For example, a DM-RS may be transmitted in the first symbol among symbols (e.g., 14 symbols) where a PUSCH is configured. In this case, the DM-RS may be transmitted in some REs in the first symbol rather than all REs therein (for example, in REs spaced at intervals of 1 or 3 REs as in a comb structure). At this time, if the UE intends to puncture the last symbol of the PUSCH since the last symbol of the PUSCH overlaps with another channel (e.g., sPUCCH), the UE may perform the puncturing only on REs of the last symbol, which are located in frequency bands where no DM-RS is transmitted, by more concerning REs of the last symbol, which are located in frequency bands where the DM-RS is transmitted.

As still a further example, the UE may exclude REs including data that may cause serious problems in data decoding due to the characteristics of channel coding (e.g., polar coding) applied to data included in the REs to be punctured and then perform the puncturing on the remaining REs.

In the above configuration, the UE may perform rate-matching instead of the puncturing operation.

The above-described various multiplexing methods can be applied not only to the UE's power-limited case but also under other conditions (e.g., gNB's configuration, etc.).

3.1.3. Third Multiplexing Method

In this section, proposed is a method by which a UE multiplexes a long PUCCH and a sPUCCH when the UE is allocated the long PUCCH and the sPUCCH within a specific slot. That is, a method of multiplexing two PUCCHs with different relative lengths will be explained in detail in this section.

First, when only time resources overlap between the long PUCCH and sPUCCH, whether the long PUCCH and sPUCCH can be simultaneously transmitted may be determined according to the simultaneous transmission capability of the UE. However, even though the UE has the simultaneous transmission capability, the UE may not transmit the long PUCCH and sPUCCH at the same time if the UE is in the power-limited case.

When the UE cannot perform simultaneous transmission due to the above various reasons, if a UCI payload of 2 bits or less is included in the sPUCCH (or the sPUCCH is transmitted based on sequence selection with no RS) or if an HARQ-ACK is included in the sPUCCH, the UE may transmit the sPUCCH by prioritizing the sPUCCH and perform puncturing (or rate-matching) on symbols in the long PUCCH which overlap with the sPUCCH.

Alternatively, if the sPUCCH includes aperiodic CSI and the long PUCCH includes periodic CSI, the UE may transmit the sPUCCH by prioritizing the sPUCCH and perform the puncturing (or rate-matching) on the symbols in the long PUCCH which overlap with the sPUCCH.

In addition, when the UE's transmission power is limited, if an RS in the sPUCCH is FDMed with UCI in the sPUCCH and the UCI is composed of coded bits, the UE may control the transmission power to be equal to or less than P_max by puncturing a minimum number of REs or RBs, which are determined according to a predetermined rule, among REs or RBs allocated to the long PUCCH in the symbols where the long PUCCH and sPUCCH overlap.

Moreover, if the two symbols of a 2-symbol sPUCCH overlaps with the last two symbols of the long PUCCH, the UE may perform the puncturing on the last symbol of the long PUCCH and the first symbol of the 2-symbol PUCCH. Alternatively, the UE may perform the rate-matching on the last symbol of the long PUCCH and perform the puncturing or rate-matching on the first symbol of the 2-symbol PUCCH. In a 2-symbol PUCCH, the same UCI may be repeated in each symbol, or encoded bit information may be distributed over all the symbols for transmission. Only when the s-PUCCH corresponds to a 2-symbol PUCCH and the same UCI is repeated and transmitted in each symbol, the UE may perform the puncturing on the 2-symbol PUCCH.

3.1.4. Additional Embodiment

In the above-described first to third multiplexing methods, a gNB may receive/detect UL channels/signals transmitted from a UE without recognizing whether the UE performs puncturing (or rate-matching) at a specific RE/RB/symbol level. In this case, since the gNB does not know whether the UE performs the puncturing (or rate-matching), serious performance degradation may occur in receiving the UL channels/signals.

To overcome the performance degradation, the UE may inform the gNB whether the puncturing (or rate-matching) is performed. Alternatively, when a different multiplexing method is applied according to the power-limited case, the UE may inform the gNB whether the power-limited case is applied.

When the UE informs whether the puncturing or rate-matching is performed, the UE may also inform the gNB of the number of REs/RB s/symbols where the puncturing or rate-matching is performed. Such information may be transmitted using a PUCCH or an SRS (which is predefined) after a corresponding slot.

When the above-described first to third multiplexing methods are applied, which one of the multiplexing methods is applied may be determined depending on the following combinations of short and long channels. Hereinafter, provided are priority rules applicable when different multiplexing methods are applied, and in this case, the following combinations (comb) can be considered.

Comb#1: Long PUCCH & sPUCCH
Comb#2: Long PUCCH & sPUSCH
Comb#3: Long PUCCH & SRS
Comb#4: Long PUSCH & sPUCCH
Comb#5: Long PUSCH & sPUSCH
Comb#6: Long PUSCH & SRS As a first priority rule, the order of priority in multiplexing can be determined as follows: channel/signal>short channel>long channel, where multiplexing (e.g., Code Division Multiplexing (CDM)) with another UE is considered. Here, the channel and signal where CDM between UEs is considered may correspond to a PUCCH and an SRS.

However, the CDM between UEs may not be considered in some PUCCH formats among a plurality of PUCCH formats.

Thus, if the CDM between UEs is considered in both the long PUCCH and sPUCCH of Comb#1, the sPUCCH may be prioritized over the long PUCCH according to the order of priority in terms of duration. Hence, the various examples described in the first multiplexing method can be applied.

Alternatively, when the CDM between UEs is considered in the long PUCCH of Comb#2, the long PUCCH may be prioritized over the sPUCCH according to the first priority rule even though it is longer than sPUCCH. Hence, the various examples described in the second multiplexing method can be applied.

As a second priority rule, the order of priority in multiplexing can be determined as follows: PUCCH>PUSCH, short channel>long channel.

Thus, in Comb#1, since each of the two channels is a PUCCH, the sPUCCH may be prioritized over the long PUCCH according to rules of duration. Hence, the various examples described in the first multiplexing method can be applied.

Alternatively, in Comb#2, since the long PUCCH corresponding to a PUCCH is prioritized over the sPUSCH, the various examples described in the second multiplexing method can be applied.

In the above-described first to third methods, whether resources overlap between short and long channels may mean whether resources overlap between sub-band regions configured for PUCCHs.

For example, when it is determined whether frequency resources overlap between a sPUCCH and a long PUSCH, sPUCCH resources that a UE actually uses may be considered as a resource region of the sPUCCH. Alternatively, predetermined UE-specific (or cell-specific) sPUCCH sub-band resources may be considered as the resource region of the sPUCCH regardless of the sPUCCH resources actually used by the corresponding UE.

As another example, when it is determined whether frequency resources overlap between a sPUCCH and a long PUSCH, long-PUCCH resources that a UE actually uses may be considered as a resource region of the long PUCCH. Alternatively, predetermined UE-specific (or cell-specific) long-PUCCH sub-band resources may be considered as the resource region of the long PUCCH regardless of the long-PUCCH resources actually used by the corresponding UE.

3.2. Method Performed by UE for Multiplexing Between sPUCCHs

In this section, methods of multiplexing multiple sPUCCHs for a single UE within a specific slot will be described in detail.

3.2.1. Fourth Multiplexing Method

In this section, a multiplexing method when a single UE is allocated sPUCCHs with the same length (e.g., 1-symbol sPUCCHs or 2-symbol PUCCHs) in one same symbol region will be explained in detail. In this multiplexing method, when it is said that resources overlap between two sPUCCHs, it may include the following two cases: a case in which only time resources overlap therebetween; and a case in which time and frequency resources overlap therebetween.

First, when only the time resources overlap between the two sPUCCHs, whether the UE can transmit the two sPUCCHs at the same time may be determined according to whether the UE has the simultaneous transmission capability or whether the power-limited case is applied.

Basically, when the UE is unable to simultaneously transmit the two sPUCCHs due to the above-mentioned matters, the UE may drop transmission of one of the two sPUCCHs (first option), transmit a total PUCCH payload, which is obtained by combining the UCI payloads of the two sPUCCHs, on one sPUCCH (second option), or control the transmission power to be equal to or less than P_max by puncturing a minimum number of REs in either or both of the two sPUCCHs (third option). In this case, the following rules may be configured to determine which one of the above options is applied depending on the payload size and/or UCI type transmitted on each sPUCCH.

A sPUCCH format may be determined depending on the size of a UCI payload. When the UCI payloads on the two sPUCCHs are intended to be transmitted on one sPUCCH, the format of the sPUCCH that will carry the UCI payloads may be changed or not depending on the size of the combined UCI payloads. In this case, if the combined UCI payloads do not change the sPUCCH format, the UE may be configured to apply the second option. On the contrary, if the combined UCI payloads change the sPUCCH format, the UE may be configured to drop one of the two sPUCCHs.

In the present disclosure, a sPUCCH format for transmitting a UCI payload of 2 bits or less can be referred to as sPF1a, and a sPUCCH format for transmitting a UCI payload of more than 2 bits can be referred to as sPF1b.

If a 2-bit UCI payload is included in sPUCCH #1 and a 10-bit UCI payload is included in sPUCCH #2, the UE may transmit a 12-bit UCI payload, which is obtained by combining the two sPUCCHs, on sPUCCH #2 using sPF1b.

Alternatively, if a 2-bit UCI payload is included in sPUCCH #1 and a 1-bit UCI payload is included in sPUCCH #2, the UE needs to change the sPUCCH format in order to transmit a 3-bit UCI payload, which is obtained by combining the two sPUCCHs. In this case, the UE may drop transmission of one of the two sPUCCHs. When a sPUCCH to be dropped is selected from the two sPUCCHs, the following rules may be applied: an HARQ-ACK is prioritized over CSI; aperiodic CSI is prioritized over periodic CSI; and sPUCCH transmission indicated by following (or preceding) DCI among a multiple pieces of DCI indicating multiple sPUCCH transmission is prioritized. Alternatively, when both the two sPUCCHs contain HARQ-ACK information, the UE may apply the second option regardless of a change in the sPUCCH format depending on the size of the combined UCI payloads.

A rule for determining a multiplexing method may be configured according to sPUCCH formats.

For example, when resources for sPF1a overlap with those for sPF1b, the UE may drop sPF1b.

As another example, it is assumed that a sPUCCH format is configured based on sequence selection with no RS by considering the Peak-to-Average Power Ratio (PAPR) of a sPUCCH (hereinafter such a sPUCCH format is referred to as sPF#A) and a sPUCCH format is configured based on FDM between a RS and UCI to support transmission of many payloads (hereinafter such a PUCCH format is referred to as sPF#B). If resources for sPF#A overlap with those for sPF#B, the UE may drop transmission of sPF#B.

When a sPUCCH corresponding to sPF#B overlaps with another sPUCCH, the UE may apply the third option. Specifically, when resources for sPF#A overlap with those for sPF#B, the UE may control the transmission power to be equal to or less than P_max by puncturing a minimum number of REs among REs of sPF#B. Alternatively, when resources overlap between sPF#B and sPF#B, the UE may control the transmission power to be equal to or less than P_max by puncturing REs of two sPF#Bs in an even manner. In addition, the UE may control the transmission power to be equal to or less than P_max by puncturing some REs of sPF#B which does not contain an HARQ-ACK.

Depending on the size of a UCI payload, the UE may differently interpret a PUCCH resource indicator. Thus, when the UE intends to transmit the UCI payloads, which are scheduled to be transmitted on the two sPUCCHs, using one of the two sPUCCHs, the UE may interpret a PUCCH resource indicator field in DL assignment differently depending on the size of the combined UCI payloads and transmit the combined UCI payloads on PUCCH resources indicated by the PUCCH resource indicator field.

3.2.2. Fifth Multiplexing Method

In this section, a multiplexing method when 2-symbol sPUCCHs are allocated to a single UE such that only one symbol overlaps between symbol regions thereof will be described in detail. In this multiplexing method, when it is said that resources overlap between two sPUCCHs, it may include the following two cases: a case in which only time resources overlap therebetween; and a case in which time and frequency resources overlap therebetween.

First, when only the time resources overlap between the two sPUCCHs, whether the UE can transmit the two sPUCCHs at the same time may be determined according to whether the UE has the simultaneous transmission capability or whether the power-limited case is applied.

Basically, when the UE is unable to simultaneously transmit the two sPUCCHs due to the above-mentioned matters, the UE may drop transmission of one of the two sPUCCHs (first option), transmit a total PUCCH payload, which is obtained by combining the UCI payloads of the two sPUCCHs, on one sPUCCH (second option), or control the transmission power to be equal to or less than P_max by puncturing a minimum number of REs in either or both of the two sPUCCHs (third option). In addition to the rules described in section 3.2.1, the following rules may be configured to determine which one of the above options is applied depending on the payload size and/or UCI type transmitted on each sPUCCH.

When the UE uses the multiplexing method according to the second option, the UE may perform multiplexing by prioritizing a 2-symbol sPUCCH appearing later in the time domain. That is, when sPUCCH #1 is allocated to symbols #n and #n+1 and sPUCCH #2 is allocated to symbols #n+1 and #n+2, if the UE transmits a UCI payload to be loaded on sPUCCH #2 using sPUCCH #1, the time for processing corresponding UCI may become insufficient. Thus, the UE may combine UCI payloads to be loaded on sPUCCH#1 and sPUCCH #2 and then transmit the combined UCI payloads on sPUCCH #2.

A 2-symbol sPUCCH may be configured to have a format where the same UCI is transmitted in each symbol (hereinafter referred to as sPF2a) or have a format where encoded bits are distributed over two symbols and then transmitted (hereinafter referred to as sPF2b).

When time resources for sPF2a partially overlap with those for sPF2b, the UE may drop sPF2a in overlapping symbols. In addition, when time resources partially overlap between sPF2a and sPF2a, the UE may drop one symbol in certain sPF2a depending on UCI types. For example, the UE may drop one symbol in sPF2a that does not include an HARQ-ACK, one symbol in sPF2a that does not include aperiodic CSI, or one symbol in sPF2a indicated by preceding (or following) DCI among a multiple pieces of DCI indicating corresponding multiple sPUCCH transmission.

A 2-symbol sPUCCH may be configured to have a format where an RS is configured and transmitted in all symbols (hereinafter referred to as sPF2c) or have a format where an RS is configured and transmitted in one symbol (hereinafter referred to as sPF2d).

When time resources for sPF2c partially overlap with those for sPF2d, if a symbol that does not include the RS of sPF2d is included in overlapping symbols, the UE may drop the corresponding symbol. Alternatively, when time resources partially overlap between sPF2d and sPF2d, if a symbol that does not include the RS of certain sPF2d is included in overlapping symbols, the UE may drop the symbol that does not include the RS of corresponding sPF2d.

3.2.3. Sixth Multiplexing Method

In this section, a multiplexing method when a single UE is allocated sPUCCHs with different lengths (e.g., a 1-symbol sPUCCH and a 2-symbol PUCCH) in one same symbol region will be explained in detail. In this multiplexing method, when it is said that resources overlap between two sPUCCHs, it may include the following two cases: a case in which only time resources overlap therebetween; and a case in which time and frequency resources overlap therebetween.

First, when only the time resources overlap between the two sPUCCHs, whether the UE can transmit the two sPUCCHs at the same time may be determined according to whether the UE has the simultaneous transmission capability or whether the power-limited case is applied.

Basically, when the UE is unable to simultaneously transmit the two sPUCCHs due to the above-mentioned matters, the UE may drop transmission of one of the two sPUCCHs (first option), transmit a total PUCCH payload, which is obtained by combining the UCI payloads of the two sPUCCHs, on one sPUCCH (second option), or control the transmission power to be equal to or less than P_max by puncturing a minimum number of REs in either or both of the two sPUCCHs (third option). In addition to the rules described in section 3.2.1, the following rules may be configured to determine which one of the above options is applied depending on the payload size and/or UCI type transmitted on each sPUCCH.

If the second symbol of a 2-symbol sPUCCH overlaps with the symbol of a 1-symbol sPUCCH, the UE may prioritize the 1-symbol sPUCCH when applying the second option. In other words, when 2-symbol sPUCCH #1 is allocated to symbols #n and #n+1 and 1-symbol sPUCCH #2 is allocated to symbol #n+1, if the UE transmits a UCI payload to be loaded on sPUCCH #2 using sPUCCH #1, the time for processing corresponding UCI may become insufficient. Thus, the UE may combine UCI payloads to be loaded on sPUCCH#1 and sPUCCH #2 and then transmit the combined UCI payloads on sPUCCH #2.

For various multiplexing methods between an SRS(s), a sPUCCH(s), a sPUSCH(s), a long PUCCH(s), and/or a long PUSCH(s) including the above-described multiplexing method, the same precoding can be applied to channels/signals by considering channel estimation and UE implementation. Specifically, when some (or all) frequency and/or time resources overlap between channels/signals, the same precoding may be applied to the channels/signals. Alternatively, when specific precoding is indicated for a specific channel/signal, the specific precoding can also be applied to channels/signals with no indicated precoding.

4. Scheduling and HARQ Operation Based on Frame Structure Applicable to NR System In the NR system to which the present disclosure is applicable, the self-contained slot structure illustrate in FIG. 6 can be divided into the four types shown in FIG. 12.

Figure 12:
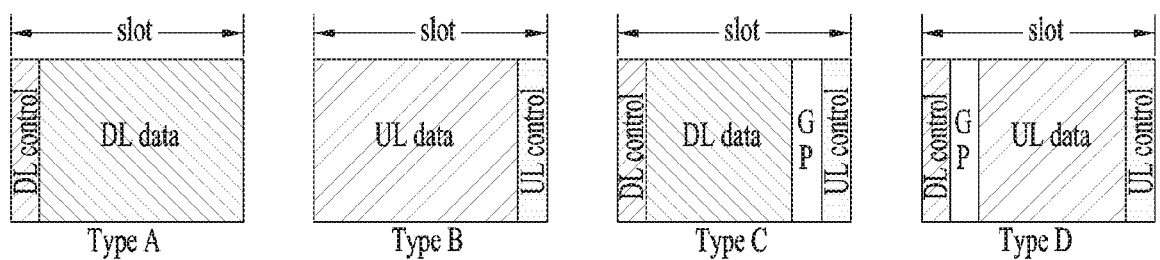
FIG. 12 is a diagram schematically illustrating examples of a self-contained slot structure applicable to the present disclosure.

FIG. 12 schematically illustrates examples of a self-contained slot structure applicable to the present disclosure.
- Type A: DL control+DL data (or DL only).
- Type B: UL data+UL control. In this case, the UL control may be dropped (dynamically) (or UL only).
- Type C: DL control+DL data+GP (guard period)+UL control (or DL+UL control).
- Type D: DL control+GP+UL data+UL control. In this case, the locations of the UL data and UL control may be reversed, or the UL control may be dropped dynamically (or DL+UL data).

The following configuration rules can be applied when the various types of slots shown in FIG. 12 are consecutively configured.

(1) Only the Type A, Type C, and Type D slots can be allowed as a slot following the Type A slot. This is because when the Type A and Type B slots are consecutive to each other, there is no separate Guard Period (GP) between the two slots. Alternatively, when the Type B slot is configured to follow the Type A slot, a GP may be separately configured in the last time period of the Type A slot.

(2) All of the Type A, Type B, Type C, and Type D slots can be allowed as a slot following the Type B slot.

(3) All of the Type A, Type B, Type C, and Type D slots can be allowed as a slot following the Type C slot.

(4) All of the Type A, Type B, Type C, and Type D slots can be allowed as a slot following the Type D slot.

Hereinafter, a method of configuring a frame using the above-described types of slots and a method of indicating HARQ timing and a scheduling slot in a corresponding frame structure will be described in detail.

4.1. Frame Structure Configuration

A total of three frame structure types have been defined in the legacy LTE system. More specifically, the three frame structure types include: frame structure type 1 (Frequency Division Duplex (FDD)) where all subframes are for either DL or UL transmission; frame structure type 2 (Time Division Duplex (TDD)) where either DL or UL transmission is defined per subframe as shown in Table 4 below; and frame structure type 3 where either DL or UL transmission is flexibly determined based on scheduling defined only for an LAA SCell in unlicensed spectrum.

TABLE 4

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

The configuration for UL/DL direction shown in Table 4 can be indicated in the NR system to which the present disclosure is applicable (through higher layer signaling or L1 signaling). In this case, the following options may be applied as a configuration method. Each slot may have one of above-described Type A, Type B, Type C, and Type D.

Option 1: The special subframes in the LTE TDD DL/UL configurations shown in Table 4 may be replaced with Type C or Type D slots, the DL subframes therein may be replaced with Type A slots, and the UL subframes therein may be replaced with Type B slots. For example, when DL/UL configuration 0 of Table 4 is indicated, slots with indices #0 and #5 may be set to Type A slots, slots with indices #2, #3, #4, #7, #8, and #9 may be set to Type B slots, and slots with indices #1 and #6 may be set to Type C or Type D slots.

Option 2: All slots may be set to Type C or Type D slots. In other words, all slots may be configured such that they includes both DL control and UL control regions. For example, whether each slot is Type C or Type D may be determined depending on which Shared Channel (SCH) is scheduled in a corresponding slot. That is, a slot where DL data is scheduled (or where no data is scheduled) may be configured/recognized as the Type C slot, and a slot where UL data is scheduled may be configured/recognized as the Type D slot. As another example, the DL and UL in Table 4 may correspond to the Type C slot and the Type D slot, respectively.

Figure 13:
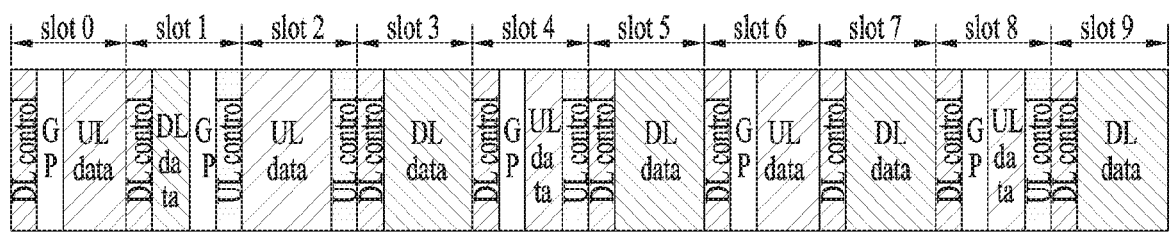
FIG. 13 is a diagram schematically illustrating a whole frame structure including a total of 10 slots applicable to the present disclosure.

Option 3: whether DL or UL data is scheduled may be preconfigured for each slot. In this case, the configuration for a control region of each slot may be additionally indicated. For example, it may be preconfigured that DL data is scheduled in odd slots (e.g., slot indices #1, #3, #5, #7, and #9) and UL data is scheduled in even slots (e.g., slot indices #0, #2, #4, #6, and #8). In this case, UL control may be configured for slot indices #1, #2, #4, and #8, and DL control may be configured for slot indices #0, #1, #3, #4, #5, #6, #7, #8, and #9. By doing so, the entire frame structure can be configured as shown in FIG. 13. FIG. 13 schematically illustrates a whole frame structure including a total of 10 slots applicable to the present disclosure.

Option 4: In contrast to Option 3, after DL/UL control regions are preconfigured, the type of each slot may be determined according to whether DL or UL data is actually scheduled.

4.2. Scheduling and HARQ Operation

4.2.1. First Scheduling and HARQ Operation

When the type of each slot is determined according to the above-described various methods, each slot may have UL control or not. If HARQ timing is indicated by DCI (higher layer signaling, L1 signaling, or a combination thereof), each slot may have different candidate HARQ timing depending on the type of each slot.

For example, when DCI transmitted in slot #n indicates that HARQ timing is after k slots, the HARQ timing may correspond to the closest slot including UL control after slot #n+k or the kth slot among slots including UL control after slot #n.

The above operation can also be applied when type configuration information of each slot is not indicated (for example, in the case of FDD or dynamic TDD). In addition, when every slot includes a UL control region (for example, in the case of Option 2 of section 4.1), the same candidate HARQ timing may be configured for each slot.

4.2.2. Second Scheduling and HARQ Operation

The HARQ timing indication method described in section 4.2.1 can also be applied to a DL/UL data scheduling delay indication method. That is, if DL/UL data scheduling delay is indicated by DCI (higher layer signaling, L1 signaling, or a combination thereof), each slot may have different candidate data transmission/reception timing depending on the type of each slot.

For example, when DCI transmitted in slot #n indicates that UL (or DL) data scheduling delay is after k slots, data scheduling delay timing (or a data scheduling delay time point) may correspond to the closest slot including a UL (or DL) data region after slot #n+k or the kth slot among slots including UL (or DL) data regions after slot #n. The above operation can also be applied when type configuration information of each slot is not indicated (for example, in the case of FDD or dynamic TDD).

4.2.3. Third Scheduling and HARQ Operation

The operation described in section 4.2.2 can also be applied to multi-slot scheduling where a single piece of DCI schedules multiple slots at the same time.

For example, when DCI transmitted in slot #n indicates that UL (or DL) data scheduling delay is maintained during m slots after k slots, a slot where UL (or DL) data transmission starts may correspond to the closest slot including a UL (or DL) data region after slot #n+k or the kth slot among slots including UL (or DL) data regions after slot #n. In this case, UL (or DL) data transmission may be attempted from the corresponding slot during m consecutive slots except slots where DL (or UL) data transmission is configured. Alternatively, the UL (or DL) transmission may be attempted from the corresponding slot during m slots including UL (or DL) data regions.

4.2.4. Fourth Scheduling and HARQ Operation

When HARQ timing is determined according to frame structures in a deterministic manner as in the legacy LTE TDD system, implicit PUCCH resource stacking may be required. In the legacy LTE system, a structure where the number of RBs reserved for a PUCCH varies depending on the size of a bundling window and RBs outside of the system bandwidth are implicitly linked from a DL subframe with small HARQ-ACK delay has been used.

However, unlike the above structure, in the NR system to which the present disclosure is applicable, the number of symbols occupied by a UL control region may vary depending on the size of a bundling window, and HARQ-ACK in the last symbol of the UL control region may be implicitly linked from a slot including a DL data region with small HARQ-ACK delay.

Hereinafter, a method by which a UE transmits a UL signal, which is applicable to the present disclosure, will be described in detail based on the above technical features.

Figure 14:
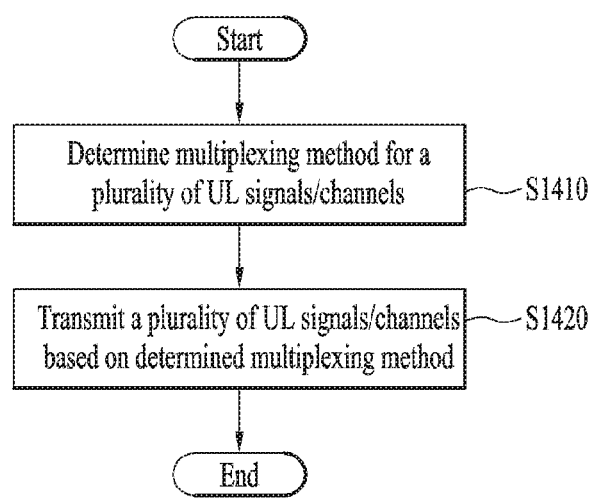
FIG. 14 is a flowchart illustrating a method by which a UE transmits an uplink signal according to an embodiment of the present disclosure.

FIG. 14 is a flowchart illustrating a method by which a UE transmits an uplink signal according to an embodiment of the present disclosure.

First, the UE determines a multiplexing method for a plurality of uplink signals/channels [S1410]. In this case, the plurality of uplink signals/channels may be scheduled by a base station. In the following, an uplink signal/channel is referred to as an uplink signal for convenience of description.

More specifically, the UE may determine the multiplexing method for the plurality of uplink signals scheduled during a predetermined length of time period by considering maximum transmission power of the UE. In this case, the predetermined length of time period may correspond to one slot including 14 symbol periods Next, the UE transmits, to the base station, the plurality of uplink signals during the predetermined length of time period based on the determined multiplexing method [S1420].

In this case, if a first uplink signal and a second uplink signal, among the plurality of uplink signals, overlap with each other within a first symbol period in a time resource domain, a multiplexing method applicable to the present disclosure may include the following methods.

First, the multiplexing method may include a first multiplexing method of performing puncturing or rate-matching at a Resource Element (RE) level within the first symbol period for either or both of the first uplink signal and second uplink signal.

The first multiplexing method may include a method of performing the puncturing or rate-matching on all REs within the first symbol period for the either or both of the first uplink signal and second uplink signal or a method of performing the puncturing or rate-matching on a predetermined number of REs within the first symbol period for the either or both of the first uplink signal and second uplink signal. In this case, the predetermined number of REs may be set to a minimum number of REs satisfying the maximum transmission power of the UE.

For example, the predetermined number of REs may be determined in descending order of indices from an RE with the largest RE index among all REs for the either or both of the first uplink signal and second uplink signal within the first symbol period.

As another example, if a DM-RS is transmitted in some REs, the puncturing may be performed only on REs where the DM-RS is not transmitted. More specifically, a DM-RS may be transmitted in some of all the PUSCH symbols. For example, a DM-RS may be transmitted in the first symbol among symbols (e.g., 14 symbols) where a PUSCH is configured. In this case, the DM-RS may be transmitted in some REs in the first symbol rather than all REs therein (for example, in REs spaced at intervals of 1 or 3 REs as in a comb structure). At this time, if the UE intends to puncture the last symbol of the PUSCH since the last symbol of the PUSCH overlaps with another channel (e.g., sPUCCH), the UE may perform the puncturing only on REs of the last symbol, which are located in frequency bands where no DM-RS is transmitted, by more concerning REs of the last symbol, which are located in frequency bands where the DM-RS is transmitted.

As still another example, the puncturing may be applied after excluding REs including data that may cause serious problems in data decoding due to the characteristics of channel coding (e.g., polar coding) applied to data included in the REs to be punctured.

As a further example, when each of the first uplink signal and second uplink signal corresponds to a PUCCH composed of one or two symbols and the first uplink signal and second uplink signal overlap within the first symbol period in the time resource domain, the first multiplexing method may be applied as a multiplexing method for the first uplink signal and second uplink signal. In this case, the first multiplexing method may include a method of performing the puncturing at the RE level during the first symbol period for both of the first uplink signal and the second uplink signal or a method of performing the puncturing at the RE level during the first symbol period for an uplink signal not including acknowledgement information among the first uplink signal and second uplink signal. Here, the acknowledgement information may include HARQ-ACK information.

In addition, the multiplexing method may include a second multiplexing method of combining information included in the first uplink signal and second uplink signal and transmitting the information via the first uplink signal or second uplink signal.

For example, when each of the first uplink signal and second uplink signal corresponds to a PUCCH and the first uplink signal and second uplink signal overlap within the first symbol period in the time resource domain, the second multiplexing method may be applied as the multiplexing method for the first uplink signal and second uplink signal.

In this case, the information included in the first uplink signal and second uplink signal may be combined, and the information may be transmitted via the second uplink signal.

Additionally, a same precoding method may be applied to the first uplink signal and second uplink signal.

In addition, when the plurality of uplink signals are transmitted during the predetermined length of time period based on the first multiplexing method, the UE may additionally transmit information on the number of REs where the puncturing is performed to the base station.

Since each of the examples of the proposed methods can be included as one method for implementing the present disclosure, it is apparent that each example can be regarded as a proposed method. In addition, although the proposed methods can be implemented independently, some of the proposed methods can be combined (or merged) for implementation. Moreover, a rule may be defined such that information on whether the proposed methods are applied (or information on rules related to the proposed methods) should be transmitted from a base station to a UE through a predefined signal (e.g., a physical layer signal, a higher layer signal, etc.).

5. Device Configuration

Figure 15:
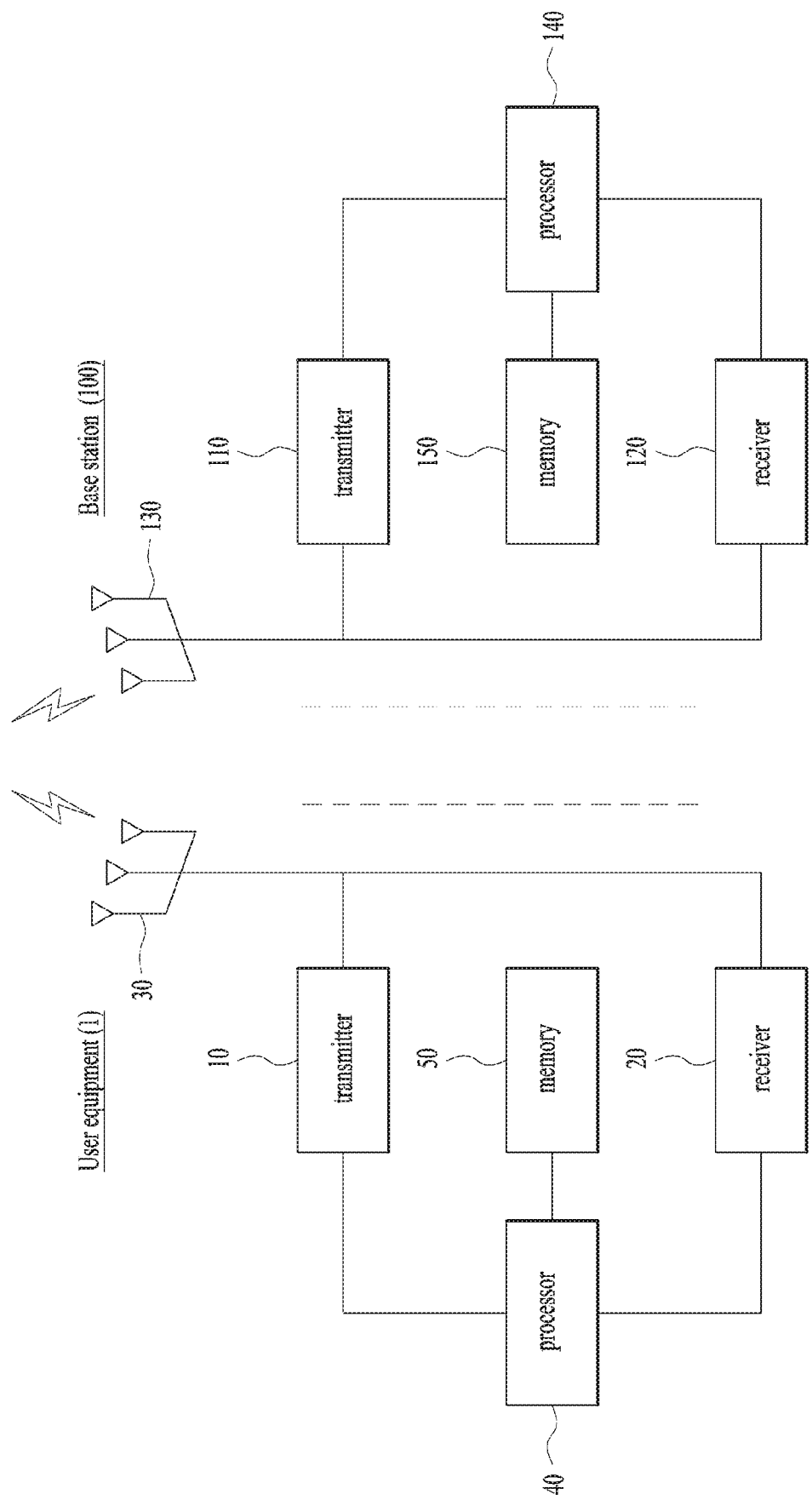
FIG. 15 is a diagram illustrating configurations of a user equipment and a base station for implementing the proposed embodiments.

FIG. 15 is a diagram illustrating configurations of a user equipment and a base station for implementing the proposed embodiments. The user equipment and base station illustrated in FIG. 15 operate to implement the above-described embodiments for the signal transmission and reception method between a user equipment and a base station.

A User Equipment (UE) 1 may act as a transmitting end in uplink and as a receiving end in downlink. A base station (eNB or gNB) 100 may act as a receiving end in uplink and as a transmitting end in downlink.

That is, each of the UE and the base station may include a Transmitter (Tx) 10 or 110 and a Receiver (Rx) 20 or 120 for controlling transmission and reception of information, data, and/or messages and an antenna 30 or 130 for transmitting and receiving information, data, and/or messages.

Each of the UE and the base station may further include a processor 40 or 140 for implementing the afore-described embodiments of the present disclosure and a memory 50 or 150 for temporarily or permanently storing operations of the processor 40 or 140.

With the above-described configuration, the UE 1 determines a method of multiplexing a plurality of uplink signals scheduled during a predetermined length of time period by considering UE's maximum transmission power. Thereafter, the UE transmits the plurality of uplink signals within the predetermined length of time period through the Tx 10 based on the determined multiplexing method.

In this case, if a first uplink signal and a second uplink signal, among the plurality of uplink signals, overlap with each other within a first symbol period in a time resource domain, the multiplexing method may be set to one of the following two multiplexing methods: a first multiplexing method of performing puncturing or rate-matching at a Resource Element (RE) level during the first symbol period for either or both of the first uplink signal and second uplink signals, or a second multiplexing method of combining information included in the first uplink signal and second uplink signal and transmitting the information via the first uplink signal or second uplink signal.

The Tx and Rx of the UE and the base station may perform a packet modulation/demodulation function for data transmission, a high-speed packet channel coding function, OFDM packet scheduling, TDD packet scheduling, and/or channelization. Each of the UE and the base station of FIG. 15 may further include a low-power Radio Frequency (RF)/Intermediate Frequency (IF) module.

Meanwhile, the UE may be any of a Personal Digital Assistant (PDA), a cellular phone, a Personal Communication Service (PCS) phone, a Global System for Mobile (GSM) phone, a Wideband Code Division Multiple Access (WCDMA) phone, a Mobile Broadband System (MB S) phone, a hand-held PC, a laptop PC, a smart phone, a Multi Mode-Multi Band (MM-MB) terminal, etc.

The smart phone is a terminal taking the advantages of both a mobile phone and a PDA. It incorporates the functions of a PDA, that is, scheduling and data communications such as fax transmission and reception and Internet connection into a mobile phone. The MB-MM terminal refers to a terminal which has a multi-modem chip built therein and which can operate in any of a mobile Internet system and other mobile communication systems (e.g. CDMA 2000, WCDMA, etc.).

Embodiments of the present disclosure may be achieved by various means, for example, hardware, firmware, software, or a combination thereof.

In a hardware configuration, the methods according to exemplary embodiments of the present disclosure may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the methods according to the embodiments of the present disclosure may be implemented in the form of a module, a procedure, a function, etc. performing the above-described functions or operations. A software code may be stored in the memory 50 or 150 and executed by the processor 40 or 140. The memory is located at the interior or exterior of the processor and may transmit and receive data to and from the processor via various known means.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein. It is obvious to those skilled in the art that claims that are not explicitly cited in each other in the appended claims may be presented in combination as an embodiment of the present disclosure or included as a new claim by a subsequent amendment after the application is filed.

INDUSTRIAL APPLICABILITY

The present disclosure is applicable to various wireless access systems including a 3GPP system, and/or a 3GPP2 system. Besides these wireless access systems, the embodiments of the present disclosure are applicable to all technical fields in which the wireless access systems find their applications. Moreover, the proposed method can also be applied to mmWave communication using an ultra-high frequency band.

What is claimed is:

1. A method of transmitting an uplink signal to a base station by a User Equipment (UE) in a wireless communication system, the method comprising:
   determining a method of multiplexing a plurality of uplink signals scheduled during a predetermined length of time period by considering maximum transmission power of the UE; and
   transmitting the plurality of uplink signals during the predetermined length of time period based on the determined multiplexing method,
   wherein when a first uplink signal and a second uplink signal, among the plurality of uplink signals, overlap with each other within a first symbol period in a time resource domain, the multiplexing method comprises:
      a first multiplexing method of performing puncturing or rate-matching at a Resource Element (RE) level during the first symbol period for either or both of the first uplink signal and second uplink signal, or
      a second multiplexing method of combining information included in the first uplink signal and second uplink signal and transmitting the information via the first uplink signal or second uplink signal,
   wherein the first multiplexing method comprises a method of performing the puncturing or rate-matching on a predetermined number of REs within the first symbol period for the either or both of the first uplink signal and second uplink signal, and
   wherein the predetermined number of REs are a minimum number of REs satisfying the maximum transmission power of the UE and the predetermined number of REs are determined in descending order of indices from an RE with a largest RE index among all REs for the either or both of the first uplink signal and second uplink signal within the first symbol period.

2. The method of claim 1, wherein the predetermined length of time period corresponds to one slot including 14 symbol periods.

3. The method of claim 1, wherein the first uplink signal or second uplink signal corresponds to any one of the following:
   a Physical Uplink Control Channel (PUCCH) composed of one or two symbols,
   a PUCCH composed of three or more symbols,
   a Physical Uplink Shared Channel (PUSCH) composed of three or fewer symbols,
   a PUSCH composed of four or more symbols, or
   a Sounding Reference Signal (SRS) composed of at least one symbol.

4. The method of claim 3, wherein when each of the first uplink signal and second uplink signal corresponds to the PUCCH composed of one or two symbols and the first uplink signal and second uplink signal overlap within the first symbol period in the time resource domain, the first multiplexing method is determined as a multiplexing method for the first uplink signal and second uplink signal, and
   wherein the first multiplexing method comprises:
      a method of performing the puncturing at the RE level during the first symbol period for both of the first uplink signal and the uplink signal or
      a method of performing the puncturing at the RE level during the first symbol period for an uplink signal not including acknowledgement information among the first uplink signal and second uplink signal.

5. The method of claim 1, wherein the predetermined number of REs are composed of only REs that are not included in frequency bands where no Demodulation Reference Signal (DM-RS) is transmitted among all REs for the either or both of the first uplink signal and second uplink signal within the first symbol period.

6. The method of claim 1, wherein when each of the first uplink signal and second uplink signal corresponds to a Physical Uplink Control Channel (PUCCH) and the first uplink signal and second uplink signal overlap within the first symbol period in the time resource domain, the second multiplexing method is determined as a multiplexing method for the first uplink signal and second uplink signal.

7. The method of claim 6, wherein when the first uplink signal is scheduled such that the first uplink signal precedes the second uplink signal in a time domain, the second multiplexing method comprises a method of combining the information included in the first uplink signal and second uplink signal and transmitting the information via the second uplink signal.

8. The method of claim 1, wherein a same precoding method is applied to the first uplink signal and second uplink signal.

9. The method of claim 1, further comprising, when the plurality of uplink signals are transmitted during the predetermined length of time period based on the first multiplexing method, transmitting to the base station, information on the number of REs on which the puncturing is performed.

10. A User Equipment (UE) for transmitting an uplink signal to a base station in a wireless communication system, the UE comprising:
   a transmitter;
   a receiver; and
   a processor connected to the transmitter and the receiver, wherein the processor is configured to:
      determine a method of multiplexing a plurality of uplink signals scheduled during a predetermined length of time period by considering maximum transmission power of the UE; and transmit the plurality of uplink signals during the predetermined length of time period based on the determined multiplexing method, wherein when a first uplink signal and a second uplink signal, among the plurality of uplink signals, overlap with each other within a first symbol period in a time resource domain, the multiplexing method comprises:
 a first multiplexing method of performing puncturing or rate-matching at a Resource Element (RE) level during the first symbol period for either or both of the first uplink signal and second uplink signal, or
 a second multiplexing method of combining information included in the first uplink signal and second uplink signal and transmitting the information via the first uplink signal or second uplink signal, wherein the first multiplexing method comprises a method of performing the puncturing or rate-matching on a predetermined number of REs within the first symbol period for the either or both of the first uplink signal and second uplink signal, and wherein the predetermined number of REs are a minimum number of REs satisfying the maximum transmission power of the UE and the predetermined number of REs are determined in descending order of indices from an RE with a largest RE index among all REs for the either or both of the first uplink signal and second uplink signal within the first symbol period.

\* \* \* \* \*